United States Patent [19]

Matsui et al.

[11] 4,250,854
[45] Feb. 17, 1981

[54] SPEED CONTROL SYSTEM FOR AUTOMOTIVE VEHICLES

[75] Inventors: Takeshi Matsui, Aichi; Akira Kuno, Oobu; Yoshio Shinoda, Okazaki, all of Japan

[73] Assignee: Nippon Soken, Inc., Nishio, Japan

[21] Appl. No.: 101,855

[22] Filed: Dec. 10, 1979

[30] Foreign Application Priority Data

Dec. 15, 1978 [JP] Japan .............................. 53-155943

[51] Int. Cl.³ ............................................. B60K 31/00
[52] U.S. Cl. ................................... 123/352; 180/179
[58] Field of Search ........................ 123/102; 361/276; 364/431; 180/170, 178, 179

[56] References Cited

U.S. PATENT DOCUMENTS

| | | | |
|---|---|---|---|
| 3,533,236 | 10/1970 | Cottingham | 123/102 |
| 3,648,798 | 3/1972 | Jania | 123/102 |
| 3,767,972 | 10/1973 | Noddings et al. | 123/102 |
| 3,891,046 | 6/1975 | Oicles | 123/102 |
| 3,983,954 | 10/1976 | Noddings et al. | 123/105 E |
| 4,086,888 | 5/1978 | Roberts | 123/102 |
| 4,094,378 | 6/1978 | Scheyhing et al. | 123/102 |
| 4,098,367 | 7/1978 | Fleischer | 364/431 |
| 4,121,273 | 10/1978 | Jarrett et al. | 361/242 |
| 4,157,126 | 6/1979 | Collonia | 123/102 |
| 4,176,633 | 12/1979 | McCabe | 123/102 |

Primary Examiner—Charles J. Myhre
Assistant Examiner—Raymond A. Nelli
Attorney, Agent, or Firm—Cushman, Darby & Cushman

[57] ABSTRACT

In a speed control system for an automotive vehicle, a speed-differential calculation circuit calculates an absolute value of a time difference between a predetermined period of time corresponding with a desired speed and an instant period of time corresponding with an actual vehicle speed, an acceleration calculation circuit calculates an absolute value of a time difference between the respective instant periods of time, a correction signal generator calculates a sum of the absolute values when each sign of the calculated time differences is positive or negative and calculates a difference between the absolute values when respective signs of the calculated time differences are opposite to each other, the correction signal generator selectively producing correction signals respectively representing the calculated sum and the calculated difference and ceasing the correction signals when each of the calculated values is zero, and a distribution circuit produces a control signal therefrom in response to the respective correction signals, the control signal being applied to an actuator to control an angular position of the engine throttle.

9 Claims, 10 Drawing Figures

4,250,854

SPEED CONTROL SYSTEM FOR AUTOMOTIVE VEHICLES

BACKGROUND OF THE INVENTION

The present invention relates to a speed control system for automotive vehicles, and more particularly to an improvement of a speed control system for an automotive vehicle of the type in which an angular position of the engine throttle is controlled in cosideration with the actual vehicle speed and the rate of change of the actual vehicle speed in relation to a desired speed.

For instance, in such a speed control system as described in U.S. Pat. No. 3,983,954 issued on Oct. 5, 1976, voltages dependent on vehicle speed and rate of change of speed are compared with a reference voltage representing a desired speed and the resultant output is compared with a periodic signal to produce output pulses of constant frequency and of a width varying with the relative magnitudes of the input voltages. These pulses are applied to an electromagnetic valve which controls the admission of pulses of reduced gas pressure from the vehicle engine inlet manifold to a chamber of variable volume and the resultant movement of a wall of the chamber is employed to control the engine throttle. This means that operation of the electromagnetic valve is frequently conducted in response to the output pulses to maintain the vehicle speed in a predetermined value. As a result, it will be experienced that the life of electromagnetic valve is shortened due to its frequent operation.

SUMMARY OF THE INVENTION

It is, therefore, a primary object of the present invention to provide an improved speed control system for an automotive vehicle in which a control signal is generated in accordance with a difference between the actual vehicle speed and a desired speed and the rate of change of the actual vehicle speed to control an angular position of the engine throttle, and wherein generation of the control signal ceases when the actual vehicle speed is maintained in a predetermined value.

According to the present invention there is provided a speed control system for an automotive vehicle driven by an internal combustion engine under control of a throttle valve, the control system comprising:

first means for producing a timing signal with a period of time responsive to an actual speed of the vehicle;

second means for producing a command signal indicative of a predetermined period of time defined by a desired speed of the vehicle;

third means responsive to the timing signal for calculating a first time difference between the predetermined period of time and an instant period of time of the timing signal and for producing a first differential signal indicative of an absolute value of the calculated first time difference and a first sign signal indicative of one of positive and negative signs of the calculated first time difference;

fourth means responsive to the timing signal for calculating a second time difference between respective instant periods of time of the preceding and following timing signals and for producing a second differential signal indicative of an absolute value of the calculated second time difference and a second sign signal indicative of one of positive and negative signs of the calculated second time difference;

fifth means responsive to the timing signal for calculating a sum of the absolute values when respective signs of the first and second sign signals are identical to each other end for calculating a difference between the absolute values when respective signs of the first and second sign signals are opposite to each other, the fifth means selectively producing first and second correction signals respectively indicative of the calculated sum and the calculated difference, the fifth means ceasing to produce the first and second correction signals when the respective calculated values are zero;

sixth means responsive to the timing signal and one of the first and second correction signals for selectively producing first and second control signals respectively in relation to the positive and negative signs of the second sign signal; and actuator means for decreasing and increasing an opening angle of said throttle valve respectively in response to the first and second control signals.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
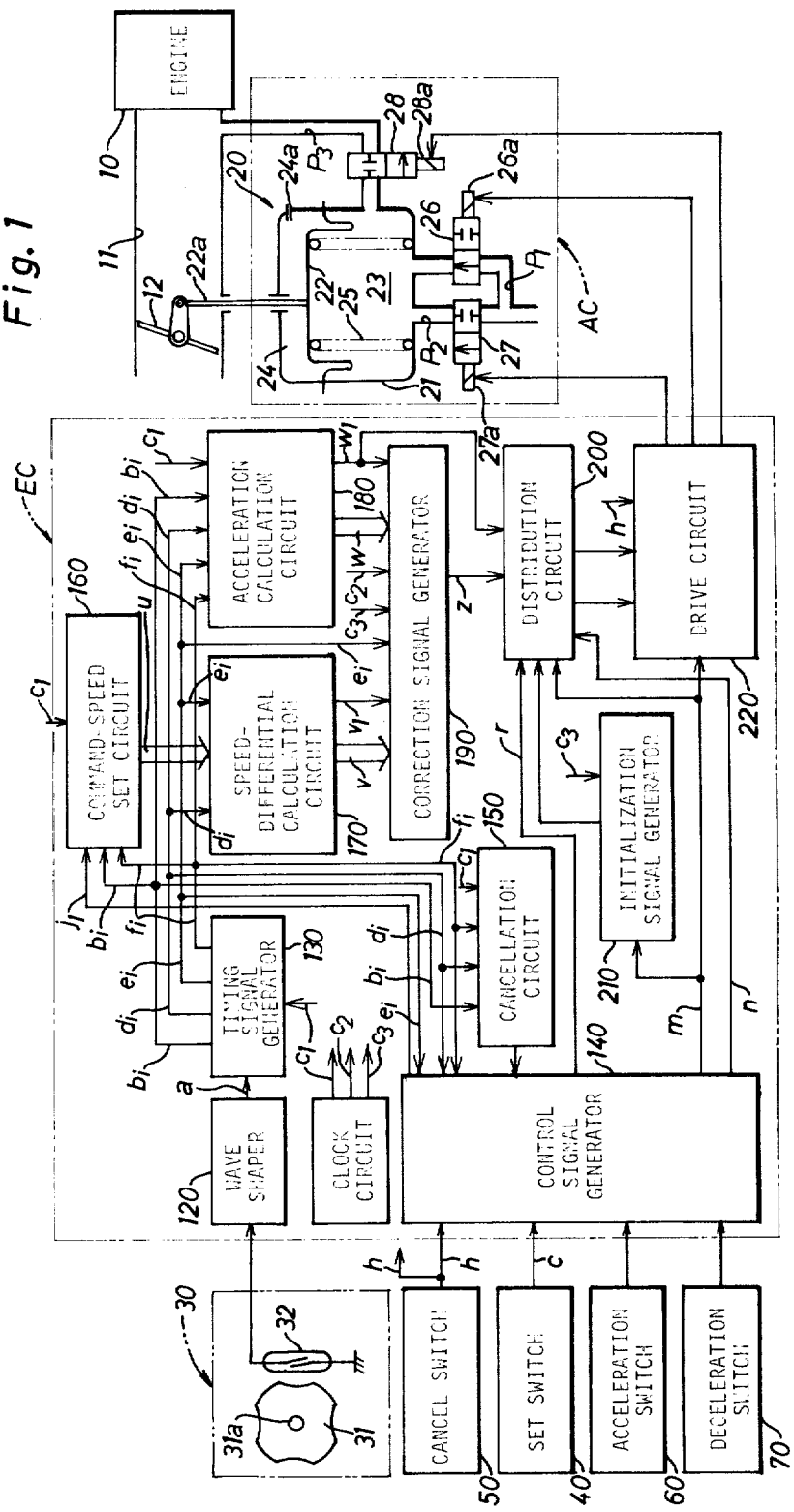
FIG. 1 is a schematic block diagram of a speed control system in accordance with the present invention which is adapted to an automotive vehicle.

Referring now to the drawings, in particular to FIG. 1 there is illustrated a speed control system in accordance with the present invention which is adapted to an internal combustion engine 10 of an automotive vehicle. The speed control system comprises a throttle actuator AC which is operatively coupled to a throttle valve 12 provided within an induction passage 11 of engine 10. The throttle actuator AC is provided with a servomotor 20 which includes a flexible diaphragm 22 housed within a casing 21 to form a servo-chamber 23 and an atmospheric chamber 24, the chamber 24 being released to the exterior through an opening 24a. The diaphragm 22 is linked with the throttle valve 12 by a rod 22a which extends through the atmospheric chamber 24 into the induction passage 11. A compression coil spring 25 is disposed within the servo-chamber 23 to bias the diaphragm 22 toward the atmospheric chamber 24 so as to close the throttle valve 12.

The throttle actuator AC is also provided with a solenoid valve 26 in the form of a normally open type and with a solenoid valve 27 in the form of a normally closed type. These solenoid valves 26 and 27 are disposed respectively within conduits $P_1$ and $P_2$ which are arranged in parallel to each other to connect the servo-chamber 23 to the exterior. The solenoid valves 26 and 27 include solenoids 26a and 27a respectively for receiving first and second output signals which will be produced from an electronic control circuit EC, as described below. When the solenoid 26a is energized in response to the first output signal from control circuit EC, the solenoid valve 26 is closed to interrupt supply of the atmospheric pressure from the exterior into the servo-chamber 23 through the conduit $P_1$. When the solenoid 27a is energized in response to the second output signal from control circuit EC, the solenoid valve 27 is opened to permit supply of the atmospheric pressure from the exterior into the servo-chamber 23 through the conduit $P_2$. A solenoid valve 28 of a normally closed type is disposed within a conduit $P_3$ through which the servo-chamber 23 is connected to the induction passage 11. The solenoid valve 28 has a solenoid 28a for receiving a third output signal which will be produced from control circuit EC, as described below. When the solenoid 28a is energized in response to the third output signal from control circuit EC, the solenoid valve 28 is opened to permit supply of negative pressure from the induction passage 11 into the servo-chamber 23 through the conduit $P_3$.

Figure 4:
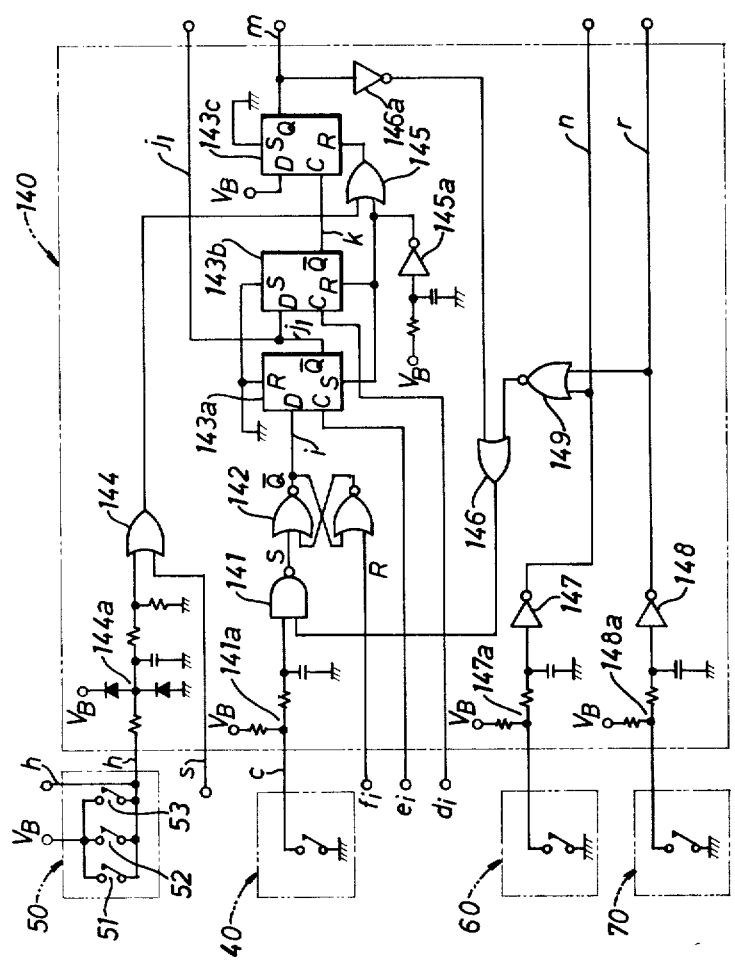
FIG. 4 is a circuit diagram of an embodiment of the control signal generator shown in block form of FIG. 1 in relation to the various switches.
Figure 5:
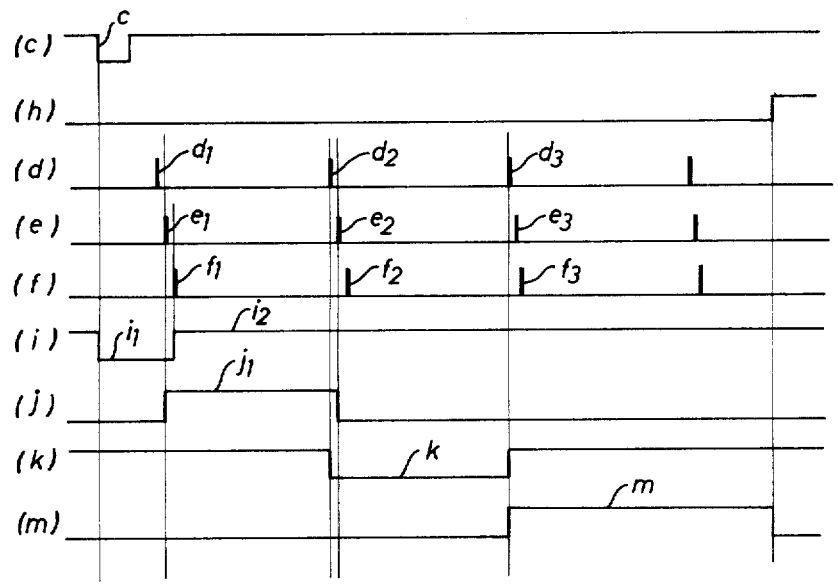
FIG. 5 illustrates waveforms obtained at various points in the control signal generator and set and cancel switches.

The speed control system also comprises a speed sensor 30 and various switches 40, 50, 60 and 70, each of which is connected to the electronic control circuit EC. The speed sensor 30 includes a reed switch 32 which is located in magnetic coupling relationship with a disc 31 of permanent magnet. The disc 31 is drivingly coupled to a flexible cable 31a of a speedometer for the automotive vehicle. The reed switch 32 is repetitively opened and closed due to rotation of the disc 31 to produce a series of electric signals respectively having a frequency proportional to an actual speed of the vehicle. In the embodiment, the frequency of the electric signal from sensor 30 is, for instance, 42.5 Hz at a vehicle speed of 60 km/h. The set switch 40 is of a normally open type, as shown in FIG. 4 and is temporarily closed at a desired or command speed of the vehicle to produce therefrom a set signal c (see FIG. 5). The set signal c is used as one necessary for setting the desired speed in the control circuit EC.

The cancel switch 50 is provided with brake, clutch and parking switches 51, 52 and 53 which are respectively in the form of a normally open type and connected in parallel to each other (see FIG. 4). The brake switch 51 is provided on a foot brake pedal of the vehicle to be closed upon depression of the brake pedal, and the clutch switch 52 is provided on a clutch pedal of the vehicle to be closed upon actuation of the clutch pedal. The parking switch 53 is also provided on a parking mechanism of the vehicle to be closed upon manipulation of the parking mechanism. When one of the switches 51, 52 and 53 is closed, the cancel switch 50 produces therefrom a release signal h (see FIG. 5) for rendering the control circuit EC inoperative. The acceleration switch 60 is of a normally open type and manually closed to produce an electric signal therefrom. The electric signal from acceleration switch 60 is used as one necessary for accelerating the vehicle under control by the control circuit EC. The deceleration switch 70 is also in the form of a normally open type and manually closed to produce an electric signal therefrom. The electric signal from deceleration switch 70 is used as one necessary for decelerating the vehicle under control by the control circuit EC.

Figure 3:
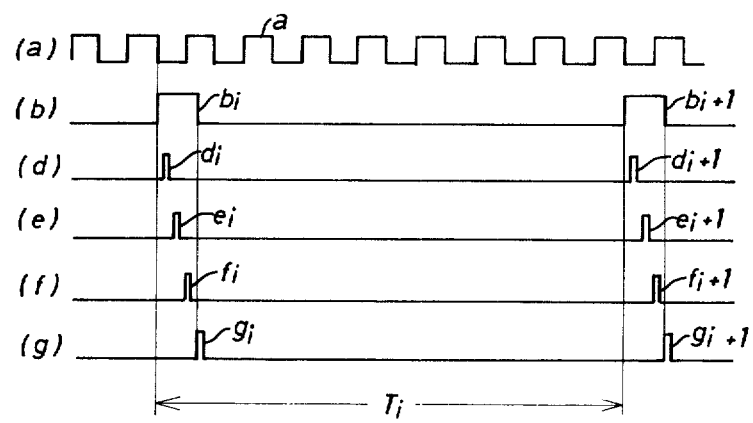
FIG. 3 illustrates waveforms obtained at various points in the wave shaper and timing signal generator.

The electronic control circuit EC includes a clock circuit 110, and a timing signal generator 130 connected through a wave shaper 120 to the speed sensor 30, as shown in FIG. 1. The clock circuit 110 serves to produce each series of first, second and third clock signals $C_1$, $C_2$ and $C_3$ therefrom. Each of the electric signals from speed sensor 30 is reshaped by the wave shaper 120 into a rectangular pulse signal a in sequence (see FIG. 3). The timing signal generator 130 produces therefrom gate, latch, preset and reset signals $b_i$, $d_i$, $e_i$ and $f_i$ ($i=1, 2, \ldots$) in accordance with each series of the first clock and pulse signals $C_1$ and a respectively from clock circuit 110 and wave shaper 120, the gate signal $b_i$ having a period of time $T_i$ (see FIG. 3).

The control circuit EC also includes a control signal generator 140 which is connected to the switches 40 to 70, the timing signal generator 130 and a cancellation circuit 150. The control signal generator 140 receives the set signal c from switch 40 and the latch, preset and reset signals $d_i$, $e_i$ and $f_i$ from timing signal generator 130 to produce therefrom a command-speed and operation signals $j_1$ and m in sequence (see FIG. 5). The command-speed signal $j_1$ is applied to a command-speed set circuit 160, and the operation signal m is applied to a distribution circuit 200, an initialization signal generator 210 and a drive circuit 220. Upon receiving the electric signal from acceleration switch 60, the control signal generator 140 produces an acceleration signal n therefrom. When received the electric signal from deceleration switch 70, the control signal generator 140 produces a deceleration signal r therefrom. The acceleration and deceleration signals n and r are respectively applied to the distribution circuit 200. The command-speed and operation signals $j_1$ and m become respectively low level by operation of the control signal generator 140 in response to the release signal h from cancel switch 50 or a release signal s which will be produced from the cancellation circuit 150, as described below.

The cancellation circuit 150 serves to produce the release signal s in accordance with the latch and reset signals $d_i$ and $f_i$ from timing signal generator 130 and a series of the first clock signals $C_1$ defined by the period of time $T_i$ of gate signal $b_i$ from signal generator 130. When received the gate and reset signals $b_i$, $f_i$ from timing signal generation 130 and the command-speed signal $j_1$ from control signal generator 140, the command-speed set circuit 160 produces and latches therein a binary signal u indicative of the period of time $T_i$ of gate signal $b_i$ in accordance with a series of the first clock signals $C_1$, a value of the binary signal u corresponding with the command-speed of the vehicle. The binary signal u from set circuit 160 is applied to a speed-differential calculation circuit 170.

Upon receiving the preset signal $e_i$ from timing signal generator 130, the speed-differential calculation circuit 170 calculates a first time difference between the value of binary signal u and a total of each period of time of the first clock signals $C_1$ defined by the period of time $T_i$ of gate signal $b_i$. When completed the calculation, the calculation circuit 170 produces therefrom a binary signal v indicative of the calculated first time difference and also produces a sign signal $v_1$ indicative of a sign of the calculated first time difference. In the embodiment, the calculated first time difference is used as a value corresponding with a speed difference between the actual and command speeds of the vehicle. The binary and sign signals v and $v_1$ are latched and applied by the calculation circuit 170 to a correction signal generator 190 in response to the latch signal $d_i$ from timing signal generator 130.

When received the preset and reset signals $e_i$ and $f_i$ from timing signal generator 130, the acceleration calculation circuit 180 calculates a second time difference between a total of each period of time of the first clock signals $C_1$ defined by the period of time $T_i$ of gate signal $b_i$ and another total of each period of time of the first clock signals $C_1$ defined by a period of time $T_{i+1}$ of a gate signal $b_{i+1}$ following the above gate signal $b_i$. When completed the calculation, the calculation circuit 180 produces therefrom a binary signal w indicative of the calculated second time difference and also produces a sign signal $w_1$ indicative of a sign of the calculated second time difference. In the embodiment, the calculated second time difference is used as a value corresponding with actual acceleration of the vehicle. The binary signal w is latched and applied by the calculation circuit 180 to the correction signal generator 190 in response to the latch signal $d_i$ from timing signal generator 130, and simultaneously the sign signal $w_1$ is latched and applied by the calculation circuit 180 to the correction signal generator 190 and distribution circuit 200.

When received the preset signal $e_i$ from timing signal generator 130 and the sign signals $v_1$, $w_1$ from calculation circuits 170, 180, the correction signal generator 190 calculates values of the binary signals v and w in accordance with each series of the second and third clock signals $C_2$, $C_3$ from clock circuit 110. Upon completing the calculation, the correction signal generator 190 produces therefrom a correction signal z having a width defined by a sum or difference of values of the binary signals v and w. The correction signal z from correction signal generator 190 is applied to the distribution circuit 200. Upon receiving the operation signal m from control signal generator 140, the initialization signal generator 210 produces an initialization signal therefrom in accordance with a series of the third clock signals $C_3$ from clock circuit 110. The initialization signal from signal generator 210 is used as one necessary to set an opening angle of throttle valve 12 in an initial value corresponding to the vehicle command-speed.

The distribution circuit 200 selectively produces first and second distribution signals therefrom in response to the operation and correction signals m and z from control and correction signal generators 140 and 190 relation to the sign signal $w_1$ from calculation circuit 180. The first distribution signal is also produced by the distribution circuit 200 in response to the initialization signal from signal generator 210 or in response to the operation and acceleration signals m and n from control signal generator 140. The second distribution signal is also produced by the distribution circuit 200 in response to the operation and deceleration signals m and r from control signal generator 140. The first and second distribution signals and respectively applied to the drive circuit 220. The drive circuit 220 produces the above-noted first output signal therefrom in response to the operation signal m from control signal generator 140 under opening of the cancel switch 50. The drive circuit 220 also produces the above-noted second and third output signals respectively in response to the second and first distribution signals from distribution circuit 200. Each of the first to third output signals from drive circuit 220 disappears in response to the release signal h from cancel switch 50.

Figure 2:
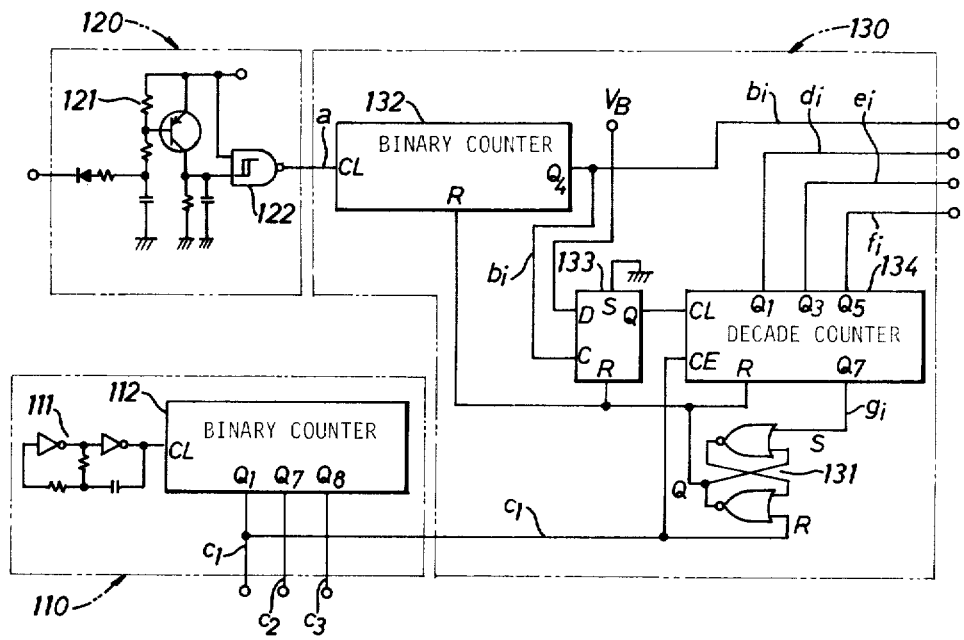
FIG. 2 is circuit diagrams of embodiments of the wave shaper, clock circuit and timing signal generator respectively shown in block form in FIG. 1.

In FIG. 2, there are illustrated preferred embodiments respectively of the clock circuit 110, the wave shaper 120 and the timing signal generator 130. The clock circuit 110 includes a binary counter 112 for receiving a series of pulse signals from an oscillator 111. The binary counter 112 serves to count the pulse signals from oscillator 111 in such a manner as to produce each series of the first, second and third clock signals $C_1$, $C_2$ and $C_3$ respectively at its output terminals $Q_1$, $Q_7$ and $Q_8$. In the embodiment, frequencies of the first, second and third clock signals $C_1$, $C_2$ and $C_3$ are determined as 8 KHz, 125 Hz and 62.5 Hz respectively. The wave shaper 120 is provided with a switching circuit 121 for receiving a series of the pulse signals from speed sensor 30. Each of the pulse signals from sensor 30 is reshaped by the switching circuit 121 and applied as a reshaped signal in sequence to a NAND-gate 122 of CD 4093 type manufactured by RCA Corporation in U.S.A. NAND-gate 122 has schmitt-trigger function and produces the rectangular pulse signal a (see FIG. 3) sequentially in response to each reshaped signal from switching circuit 121.

The timing signal generator 130 includes a binary counter 132 which is connected to an RS-flip flop 131 and a D-flip flop 133. RS-flip flop 131 has a reset terminal R for receiving a series of the first clock signals $C_1$ from clock circuit 110 and a set terminal s for receiving a high level signal $g_i$ which will be generated from a decade counter 134, as described below. RS-flip flop 131 produces a high level signal at its output terminal Q in response to the high level signal $g_i$ from counter 134. Thereafter, RS-flip flop 131 also produces a low level signal therefrom when one of the first clock signals $C_1$ becomes high level. The binary counter 132 is of CD 4024 type which is manufactured by RCA Corporation. The counter 132 is provided with a reset terminal R for receiving the high or low level signal from RS-flip flop 131 and with a clock terminal CL for receiving a series of the rectangular pulse signals a from wave shaper 120. When reset by the high level signal from RS-flip flop 131, the counter 132 serves to produce a low level signal at its output terminal $Q_4$. When released from the reset condition in response to the low level signal from RS-flip flop 131, the counter 132 counts a series of the rectangular pulse signals a to produce the gate signal $b_i$. The period of time $T_i$ of gate signal $b_i$ corresponds with a frequency which is one-eighth as high as that of rectangular pulse signal a, a leading edge of gate signal $b_i$ being in synchronization with a trailing edge of rectangular pulse singal a (see FIG. 3).

D-flip flop 133 is of CD 4013 type manufactured by RCA Corporation and is provided with a reset terminal R for receiving the high or low level signal from RS-flip flop 131. D-flip flop 133 is also provided with a clock terminal C for receiving the gate signal $b_i$ from counter 132 and with an input terminal D for receiving a DC voltage $V_B$ from an electric power source in the form of a vehicle battery. When reset by the high level signal from RS-flip flop 131, D-flip flop 133 serves to produce a low level signal at its output terminal Q. After released from the reset condition by the low level signal from RS-flip flop 131, D-flip flop 133 also produces a high level signal therefrom in response to the gate signal $b_i$. The decade counter 134 is of CD 4017 type which is manufactured by RCA Corporation. The counter 134 is provided with a clock-enable terminal CE for receiving a series of the first clock signals $C_1$ from clock circuit 110 and with reset and clock terminals R and CL for respectively receiving the low or high level signals from RS-flip flop 131 and D-flip flop 133. When reset by the high level signal from RS-flip flop 131, the counter 134 produces low level signals respectively at its output terminals $Q_1$, $Q_3$, $Q_5$ and $Q_7$. After released from the reset condition by the low level signal from RS-flip flop 131, the counter 134 counts a series of the first clock signals $C_1$ in response to the high level signal from D-flip flop 133 to produce the latch, preset, reset and high level signals $d_i$, $e_i$, $f_i$ and $g_i$ respectively at the output terminals $Q_1$, $Q_3$, $Q_5$ and $Q_7$ in sequence. In the embodiment, the latch, preset and reset signals $d_i$, $e_i$ and $f_i$ are produced during generation of gate signal $b_i$, and the high level signal $g_i$ sets RS-flip flop 131 to make the gate signal $b_i$ low level (see FIG. 3). In addition, the counting operation of counter 134 is disabled in response to the low level signal from D-flip flop 133.

FIG. 4 illustrates a preferred embodiment of the control signal generator 140 which includes an RS-flip flop 142 controlled by a NAND-gate 141 and the timing singal generator 130. NAND-gate 141 has a first input terminal for receiving one of the DC voltage $V_B$ and set signal c respectively from the vehicle battery and set switch 40 through a protective circuit 141a. NAND-gate 141 also has a second input terminal for receiving a high or low level signal which will be produced from an OR-gate 146, as described below. NAND-gate 141 serves to produce a low level signal therefrom in response to the DC voltage $V_B$ and the high level signal from OR-gate 146. NAND-gate 141 also produces a high level signal therefrom in response to one of the set signal c and the low level signal from OR-gate 146. RS-flip flop 142 is composed of a pair of NOR-gates and provided with a set terminal s for receiving the high or low level signal from NAND-gate 141. RS-flip flop 142 is also provided with a reset terminal R for receiving the reset signal $f_i$ from timing signal generator 130. When the high level signal appears from NAND-gate 141, RS-flip flop 142 produces a low level signal $i_1$ (see FIG. 5) at its output terminal $\overline{Q}$. RS-flip flop also produces a high level signal $i_2$ therefrom in response to the reset signal $f_i$.

The control signal generator 140 also includes D-flip flop 143a and 143b of CD 4013 type, manufactured by RCA Corporation, which are controlled by a power-on reset circuit 145a. The power-on reset circuit 145a has an inverter which receives the DC voltage $V_B$ from the vehicle battery through a resistor and a capacitor to produce a reset signal therefrom. D-flip flop 143a is provided with an input terminal D for receiving one of the low and high level signals $i_1$ and $i_2$ from RS-flip flop 142 and with reset and clock terminals S and C for respectively receiving the reset signal from reset circuit 145a and the preset signal $e_i$ from timing signal generator 130. D-flip flop 143a receives the low level signal $i_1$ from RS-flip flop 142 after reset by the reset signal from reset circuit 145a to produce a high level signal as the command-speed signal $j_1$ at its output terminal $\overline{Q}$ in response to the preset signal $e_i$. The command-speed signal $j_1$ is made low level by D-flip flop 143a in response to the high level signal $i_2$ from RS-flip flop 142 and a preset signal which will be produced following the preset signal $e_i$ from timing signal generator 130. D-flip flop 143b is provided with an input terminal D for receiving the command-speed signal $j_1$ from D-flip flop 143a and with reset and clock terminals R and C for respectively receiving the reset signal from reset circuit 145a and the latch signal $d_i$ from timing signal generator 130. D-flip flop 143b receives the command-speed signal $j_1$ from D-flip flop 143a after reset by the reset signal from reset circuit 145a to produce a low level signal k (see FIG. 5) at its output terminal $\overline{Q}$ in response to the latch signal $d_i$. When a latch signal following the latch signal $d_i$ is produced from timing signal generator 130, the low level signal k is made high level by D-flip flop 143b on a bais of the low level signal from D-flip flop 143a.

In the timing signal generator 140, an OR-gate 144 is provided with a first input terminal for receiving the release signal h from cancel switch 50 through a protective circuit 144a and with a second input terminal for receiving the release signal s from cancellation circuit 150. OR-gate 144 serves to produce a high level signal therefrom in response to one of the release signals h and s. When the release signal s is low level under opened condition of cancel switch 50, OR-gate 144 produces a low level signal therefrom. The low and high level signals from OR-gate 144 are respectively applied to an OR-gate 145. OR-gate 145 has input terminals for respectively receiving the low or high level signal from OR-gate 144 and the reset signal from reset circuit 145a. OR-gate 145 produces a high level signal therefrom in response to one of the high level and reset signals respectively from OR-gate 144 and reset circuit 145a. Upon disappearance of the high level and reset signals from OR-gate 144 and reset circuit 145a, OR-gate 145 produces a low level signal therefrom. The high and low level signals from OR-gate 145 are respectively applied to a D-flip flop 143c. D-flip flop 143c is provided with an input terminal D for receiving the DC voltage $V_B$ from the vehicle battery and with reset and clock terminals R and C for receiving the low and high level signals respectively from OR-gate 145 and D-flip flop 143b. When reset by the high level signal from OR-gate 145, D-flip flop 143c produces a low level signal at its output terminal Q. After released from the reset condition in response to the low level signal from OR-gate 145, D-flip flop 143c produces a high level signal as the operation signal m (see FIG. 5) in response to a trailing edge of the low level signal k.

The above-noted OR-gate 146 has input terminals for respectively receiving output signals from an inverter 146a and a NOR-gate 149. The inverter 146a serves to invert the operation signal m from D-flip flop 143c. NOR-gate 149 has input terminals for respectively receiving output signals from inverters 147 and 148. The inverter 147 receives the DC voltage $V_B$ from the vehicle battery through a protective circuit 147a to produce a low level signal therefrom. Upon closure of the acceleration switch 60, the inverter 147 also receives the electric signal from switch 60 through the protective circuit 147a to produce therefrom a high level signal as the acceleration signal n. Meanwhile, the inverter 148 receives the DC voltage $V_B$ from the vehicle battery through a protective circuit 148a to produce a low level signal therefrom. Upon closure of the deceleration switch 70, the inverter 148 also receives the electric signal from switch 70 through the protective circuit 148a to produce therefrom a high level signal as the deceleration signal r. With the above-noted constructions, NOR-gate 149 serves to produce therefrom a high level signal in response to the low level signals respectively from inverters 147 and 148. NOR-gate 149 also produces a low level signal therefrom in response to one of the acceleration and deceleration signals n and r respectively from inverters 147 and 148. OR-gate 146 produces a low level signal therefrom in response to the low level signals respectively from inverter 146a and NOR-gate 149. OR-gate 146 also produces a high level signal therefrom in response to one of the high level signals respectively from inverter 146a and NOR-gate 149. In addition, the above-noted protective circuits 141a, 144a, 147a and 148a function to protect NAND-gate 141, OR-gate 144, inverters 147, 148 respectively.

Figure 6:
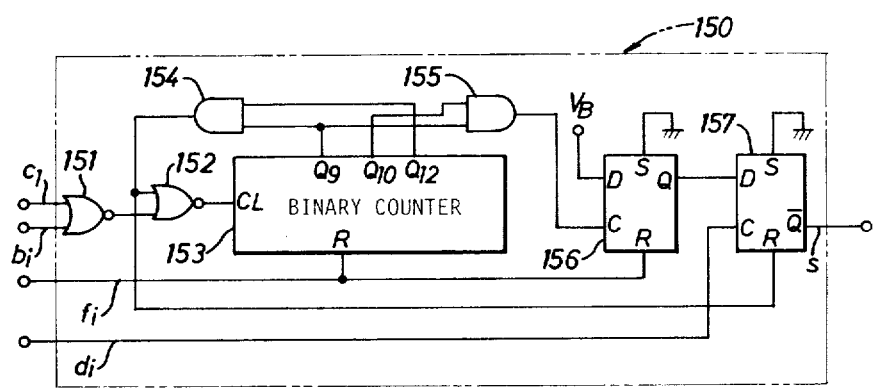
FIG. 6 is a circuit diagram of an embodiment of the cancellation circuit shown in block form in FIG. 1.

FIG. 6 illustrates a preferred embodiment of the cancellation circuit 150 which comprises a binary counter 153 connected to the clock circuit 110 and timing signal generator 130 through NOR-gate 151, 152. NOR-gate 151 is provided with input terminals for respectively receiving a series of the first clock signals $C_1$ from clock circuit 110 and the gate signal $b_i$ from timing signal generator 130. NOR-gate 151 produces a low level signal therefrom in response to the gate and first clock signals $b_i$ and $C_1$. When the gate signal $b_i$ is low level, NOR-gate 151 produces a pulse signal in sequence in response to each of the first clock signals $C_1$. NOR-gate 152 has input terminals for respectively receiving a series of the pulse signals from NOR-gate 151 and an output signal which will be produced from an AND-gate 154, as described below. When the output signal from AND-gate 154 is low level, each of the pulse signals from NOR-gate 151 is produced as one of the first clock signals $C_1$ in sequence from NOR-gate 152. When the output signal from AND-gate 154 is high level, NOR-gate 152 produces a low level signal in response to the pulse signals from NOR-gate 151. This means that NOR-gate 152 produces a series of the first clock signals $C_1$ defined by the period of time $T_i$ of gate signal $b_i$. In the embodiment, a time interval in which the gate signal $b_i$ is low level is assumed equal substantially to the period of time $T_i$ because a width of gate signal $b_i$ is very narrow.

The binary counter 153 is of CD 4020 type which is manufactured by RCA Corporation. The counter 153 is provided with a reset terminal R for receiving the reset signal $f_i$ from timing signal generator 130 and with a clock terminal CL for receiving a series of the first clock signals $C_1$ from NOR-gate 152. When reset by the reset signal $f_i$, the counter 153 produces low level signals respectively at its output terminals $Q_9$, $Q_{10}$ and $Q_{12}$. After released from the reset condition at a trailing edge of reset signal $f_i$, the counter 153 counts a series of the first clock signals $C_1$ within the period of time $T_i$ of gate signal $b_i$, the counter 153 producing at least one high level signal therefrom in accordance with the counted value thereof. In case the counted value of counter 153 is under a number of 768 or the vehicle speed is more than 120 km/h, the counter 153 produces a first high level signal only at the output terminal $Q_9$. In case the counted value of counter 153 is a number of not less than 768 and under 2304 or the vehicle speed is 120 km/h or less and over 40 km/h, the counter 153 produces the first high level signal and a second high level signal respectively at the output terminals $Q_9$ and $Q_{10}$. In case the counted value of counter 153 is a number of not less than 2304 or the vehicle speed is not more than 40 km/h, the counter 153 also produces the first high level signal and a third high level signal respectively at the output terminals $Q_9$ and $Q_{12}$.

AND-gate 154 described above has input terminals for receiving the first and third high level signals from counter 153. AND-gate 154 produces a high level signal therefrom in response to the first and third high level signals from counter 153. When one of the first and third high level signals from counter 153 is low level, AND-gate 154 produces a low level signal therefrom. An AND-gate 155 is provided with input terminals for receiving the first and second high level signals from counter 153. AND-gate 155 produces a high level signal therefrom in response to the first and second high level signals from counter 153. When one of the first and second high level signals from counter 153 is low level, AND-gate 155 produces a low level signal therefrom. The low and high level signals from AND-gate 155 are respectively applied to a D-flip flop 156.

D-flip flop 156 is provided with a reset terminal R for receiving the reset signal $f_i$ from timing signal generator 130 and also with input and clock terminals D and C for respectively receiving the DC voltage $V_B$ from the vehicle battery and the high and low level signals from AND-gate 155. D-flip flop 156 serves to produce a low level signal at its output terminal Q in response to the reset signal $f_i$. D-flip flop 156 also produces a high level signal therefrom in response to the high level signal from AND-gate 155. A D-flip flop 157 is provided with a reset terminal R for receiving the high and low level signals from AND-gate 154 and also with input and clock terminals D and C for respectively receiving the high and low level signals from D-flip flop 156 and the latch signal $d_i$ from timing signal generator 130. D-flip flop 157 serves to produce a high level signal as the release signal s at its output terminal $\overline{Q}$ in response to the high level signal from AND-gate 154. The release signal s from D-flip flop 157 is also conducted in response to the latch signal $d_i$ and the low level signal from D-flip flop 156 under the low level signal from AND-gate 154. The release signal s from D-flip flop 157 is rendered low level in response to the latch signal $d_i$ and the high level signal from D-flip flop 156 under the low level signal from AND-gate 154.

Figure 7:
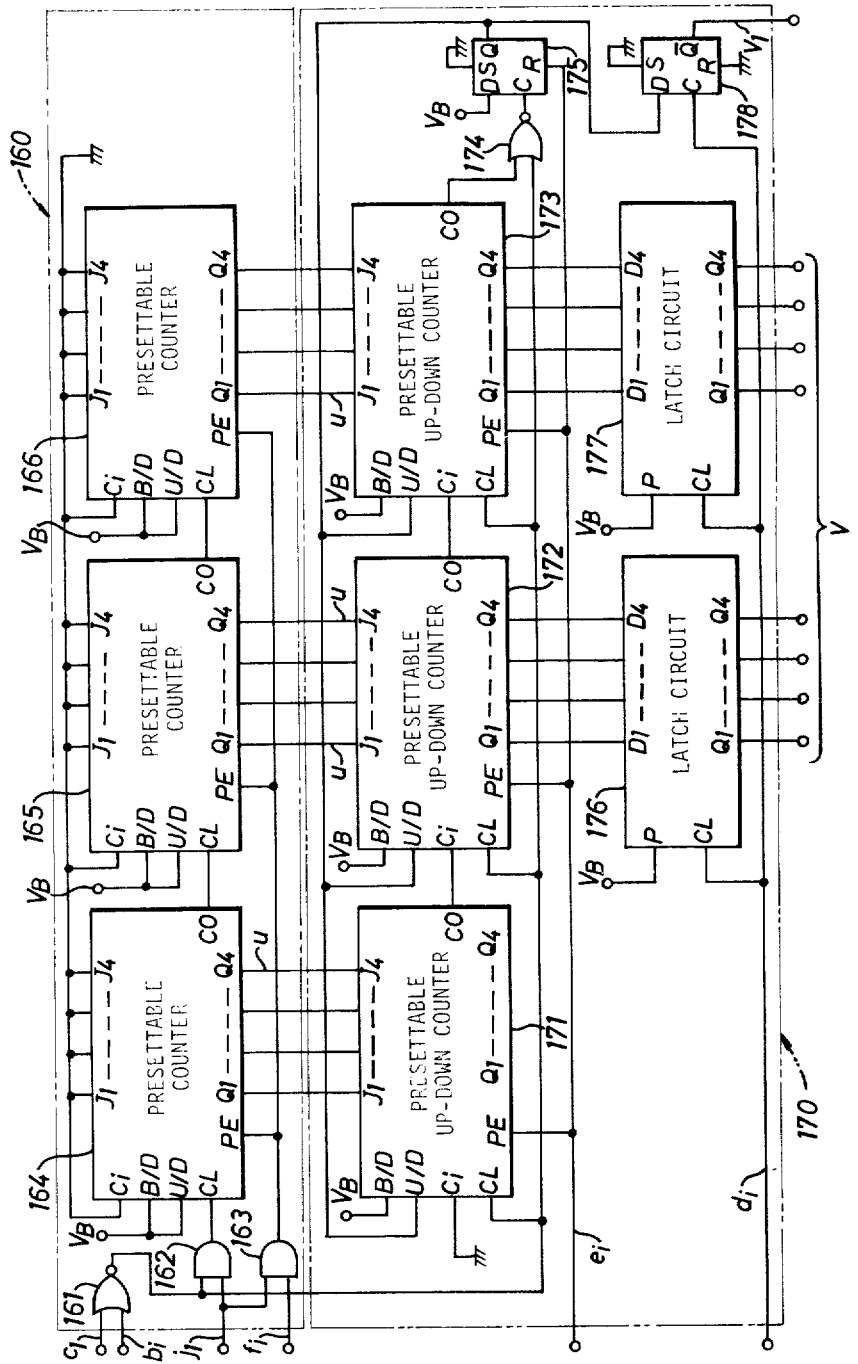
FIG. 7 is circuit diagrams of embodiments of the command-speed set circuit and speed-differential calculation circuit respectively shown in block form in FIG. 1.

In FIG. 7, there are respectively illustrated preferred embodiments of the command-speed set circuit 160 and the speed-differential calculation circuit 170. The command-speed set circuit 160 includes presettable up-down counters 164, 165 and 166 which are controlled by a NOR-gate 161 and AND-gates 162, 163. NOR-gate 161 has input terminals for respectively receiving a series of the first clock signals $C_1$ from clock circuit 110 and the gate signal $b_i$ from timing signal generator 130. During generation of the gate signal $b_i$, NOR-gate 161 produces a low level signal therefrom in response to the first clock signals $C_1$. When the gate signal $b_i$ becomes low level, NOR-gate 161 produces a pulse signal therefrom in sequence in response to each of the first clock signals $C_1$. AND-gate 162 has input terminals for respectively receiving a series of the pulse signals from NOR-gate 161 and the command-speed signal $j_1$ from control signal generator 140. During generation of the command-speed signal $j_1$, AND-gate 162 sequentically .

produces a pulse signal as one of the first clock signals $C_1$ in response to each of the pulse signals from NOR-gate 161. When the command-speed signal $j_1$ becomes low level, AND-gate 162 also produces a low level signal therefrom in response to a series of the pulse signals from NOR-gate 161. AND-gate 163 receives at its input terminals the command-speed and reset signals $j_1$ and $f_i$ respectively from control and timing signal generators 140 and 130 to produce a high level signal therefrom. When one of the signals $f_i$, $j_1$ is low level, AND-gate 163 also produces a low level signal therefrom.

The presettable up-down counters 164, 165 and 166 are respectively of CD 4029 type manufactured by RCA Corporation. Each of the counters 164, 165 and 166 is provided with input terminals B/D and U/D respectively for receiving the DC voltage $V_B$ from the vehicle battery and with jam input terminals $J_1$ to $J_4$ grounded respectively. This means that each of the counters 164, 165 and 166 serves to function as a four-bit up counter. The counter 164 is provided with a clock terminal CL for receiving a series of the first clock signals $C_1$ from AND-gate 162 and also with a preset-enable terminal PE for receiving the high level signal from AND-gate 163. When reset by the high level signal from AND-gate 163, the counter 164 produces low level signals respectively at its carry-out and output terminals CO and $Q_1$ to $Q_4$. After released from the reset condition in response to the low level signal from AND-gate 163, the counter 164 starts to count up a series of the first clock signals $C_1$ from AND-gate 162 to produce a high level signal at its carry-out terminal CO. When a value counted up in counter 164 reaches the maximum, the counter 164 produces output signals indicative of the maximum value respectively at its output terminals $Q_1$ to $Q_4$ and also produces a low level signal at its carry-out terminal CO. The above-noted operation of counter 164 is repeated during generation of a series of the first clock signals $C_1$ from AND-gate 162 and stopped in response to the low level signal from AND-gate 162.

The presettable up counter 165 is provided with a clock terminal CL for receiving a series of the high level signals from the carry-out terminal CO of counter 164 and also with a preset-enable terminal PE for receiving the high level signal from AND-gate 163. When reset by the high level signal from AND-gate 163, the counter 165 produces low level signals respectively at its carry-out and output terminals CO and $Q_1$ to $Q_4$. After released from the reset condition in response to the low level signal from AND-gate 163, the counter 165 starts to count up a series of the high level signals from counter 164 to produces a high level signal at its carry-out terminal CO. When a value counted up in counter 165 reaches the maximum, the counter 165 produces output signals indicative of the maximum value respectively at its output terminals $Q_1$ to $Q_4$ and also produces a low level signal at its carry-out terminal CO. The above-noted operation of counter 164 is repeated during generation of a series of the high level signals from counter 164 and stopped when operation of counter 164 is stopped.

The presettable up counter 166 is provided with a clock terminal CL for receiving a series of the high level signals from the carry-out terminal CO of counter 165 and also with a preset-enable terminal PE for receiving the high level signal from AND-gate 163. When reset by the high level signal from AND-gate 163, the counter 166 produces low level signals respectively at its output terminals $Q_1$ to $Q_4$. After released from the reset condition in response to the low level signal from AND-gate 163, the counter 166 starts to count up a series of the high level signals from counter 165. Upon completing count operation of counter 166, all the output signals from counters 164 to 166 are respectively latched and applied to the speed-differential calculation circuit 170 as a binary signal u indicative of the period of time $T_i$ of gate signal $b_i$. In other words, this means that the binary signal u is defined by the vehicle command-speed upon closure of set switch 40.

The speed-differential calculation circuit 170 includes a D-flip flop 175 which is controlled by a NOR-gate 174 and the timing signal generator 130. NOR-gate 174 has input terminals for respectively receiving the low and pulse signals from NOR-gate 161 and low and high level signals which will be produced from a carry-out terminal CO of a presettable up-down counter 173, as described below. NOR-gate 174 produces a high level signal therefrom in response to the low level signals from NOR-gate 161 and counter 173 and also produces a low level signal therefrom in response to one of the pulse and high level signals from NOR-gate 161 and counter 173. D-flip flop 175 is provided with an input terminal D for receiving the DC voltage $V_B$ from the vehicle battery and with a clock terminal C for receiving the low and high level signals from NOR-gate 174. D-flip flop 175 is also provided with a reset terminal R for receiving the present signal $e_i$ from timing signal generator 130. When reset by the preset signal $e_i$, D-flip flop 175 produces a low level signal at its output terminal Q. after released from the reset condition at a trailing edge of preset signal $e_i$, D-flip flop 175 produces a high level signal therefrom in response to the high level signal from NOR-gate 174.

The speed-differential calculation circuit 170 also includes a presettable up-down counter 171 which is of CD 4029 type manufactured by RCA Corporation. The counter 171 is provided with jam input terminals $J_1$ to $J_4$ for respectively receiving the output signals from counter 164 and with input terminals B/D and U/D for respectively receiving the DC voltage $V_B$ from the vehicle battery and the low and high level signals from D-flip flop 175. The counter 171 is also provided with a clock terminal CL for receiving the low level and pulse signals from NOR-gate 161 and with a preset-enable terminal PE for receiving the preset signal $e_i$ from timing signal generator 130, a carry-in terminal $C_i$ of counter 171 being grounded. When preset by the preset signal $e_i$, the counter 171 receives the output signals from counter 164 therein and produces a high level signal at its carry-out terminal CO. After released from the preset condition at the trailing edge of preset signal $e_i$, the counter 171 starts to count down the output signals from counter 164 in accordance with a series of the pulse signals from NOR-gate 161 under generation of the low level signal from D-flip flop 175. The counter 171 maintains generation of the high level signal therefrom during its count-down operation and produces a low level signal at its carry-out terminal CO when a value counted down in counter 171 reaches zero. This count-down operation in counter 171 is repeated to alternatively generate high and low level signals from the carry-out terminal CO of counter 171.

In case the high level signal appears from D-flip flop 175, the counter 171 also starts to count up the remaining pulse signals from NOR-gate 161 so as to produce a high level signal at its carry-out terminal CO. Then, the counter 171 maintains generation of the high level signal therefrom during its count-up operation and produces a low level signal at its carry-out terminal CO when a valve counted up in counter 171 reaches the maximum. This count-up operation in counter 171 is repeated to alternatively generate high and low level signals from the carry-out terminal CO of counter 171 and is stopped in response to the low level signal from NOR-gate 161. In addition, description regarding output signals, which the counter 171 will produce at its output terminals $Q_1$ to $Q_4$ upon completion of its count operation, is eliminated because a value of the output signals from counter 171 may be neglected in the embodiment.

A presettable up-down counter 172 is provided with jam input terminals $J_1$ to $J_4$ for receiving the output signals from counter 165 and also with a carry-in terminal $C_i$ for receiving the high and low level signals from counter 171, other constructions of counter 172 being the same as those of the counter 171. When preset by the present signal $e_i$, the counter 172 receives therein the output signals from counter 165. The counter 172 is also inhibited in its count-down operation due to the high level signal from counter 171 to produce a high level signal at its carry-out terminal CO. When received the low level signal from counter 171, the counter 172 counts down the output signals from counter 165 in accordance with a series of the pulse signals from NOR-gate 161 under generation of the low level signal from D-flip flop 175. This count-down operation in counter 172 is repeated in response to each low level signal from counter 171 under generation of the low level signal from D-flip flop 175 to alternatively produce high and low level signals from the carry-out terminal CO of counter 172. In case count-down operation in counter 172 is completed under generation of the low level signal from D-flip flop 175, the counter 172 produces output signals at its output terminals $Q_1$ to $Q_4$ upon completion of its count-down operation. In case the high level signal appears from D-flip flop 175, the counter 172 also repititively counts up the remaining pulse signals from NOR-gate 161 in response to each low level signal from counter 171 to alternatively produce high and low level signals at its carry-out terminal CO. When completed count-up operation thereof, the counter 172 produces output signals at its output terminals $Q_1$ to $Q_4$.

The presettable up-down counter 173 described above is provided with jam input terminals $J_1$ to $J_4$ for receiving the output signals from counter 166 and also with a carry-in terminal $C_i$ for receiving the high and low level signals from counter 172, other constructions of counter 173 being the same as those of the counter 171. When preset by the preset signal $e_i$, the counter 173 receives therein the output signals from counter 166. The counter 173 is also inhibited in its count-down operation due to the high level signal from counter 172 to produce a high level signal at its carry-out terminal CO. When received the low level signal from counter 172, the counter 173 counts down the output signals from counter 166 in accordance with a series of the pulse signals from NOR-gate 161 under generation of the low level signal from D-flip flop 175. This count-down operation in counter 173 is conducted in response to each low level signal from counter 172 under generation of the low level signal from D-flip flop 175 to maintain generation of the high level signal therefrom. In case a value of the binary signal u is longer than the period of time $T_i$ of gate signal $b_i$, the counter 173 produces output signals at its output terminals $Q_1$ to $Q_4$ upon completion of its count-down operation and maintains generation of the high level signal at its carry-out terminal CO. In case the value of binary signal u is shorter than the period of time $T_i$ of gate signal $b_i$, the counter 173 produces a low level signal at its carry-out terminal CO upon reach of counted value down to zero. Then, the counter 173 also counts up the remaining pulse signals from NOR-gate 161 in response to each low level signal from counter 172 under generation of the high level signal from D-flip flop 175 to produce output signals at its output terminals $Q_1$ to $Q_4$ upon completion of its count-up operation.

In summary, in case the value of binary signal u is shorter than a total period of time of a series of the pulse signals issued from NOR-gate 161 within the period to time $T_i$ of gate signal $b_i$, all the counters 171, 172 and 173 count down the value of binary signal u in accordance with a series of the above-noted pulse signals from NOR-gate 161 under generation of the low level signal from D-flip flop 175. The counters 171, 172 and 173 then count up a remainder of the above-noted pulse signals in response to the high level signal from D-flip flop 175 such that output signals are produced from counters 172, 173 as a binary signal indicating an absolute value of a time difference between the value of binary signal u and the total period of time of the above-noted pulse signals from NOR-gate 161, the time difference having a negative sign defined by the high level signal from D-flip flop 175. In case the value of binary signal u is longer than the total period of time of a series of the above-noted pulse signals from NOR-gate 161, all the counters 171, 172 and 173 count down the value of binary signal u in accordance with all the above-noted pulse signals from NOR-gate 161 under generation of the low level signal from D-flip flop 175 such that output signals are produced from the counters 172, 173 as a binary signal indicating an absolute value of another time difference between the value of binary signal u and the total period of time of the above-noted pulse signals from NOR-gate 161, another time difference having a positive sign defined by the low level signal from D-flip flop 175.

The speed-differential calculation circuit 170 further includes a pair of latch circuits 176, 177 which are controlled by the timing signal generator 130. The latch circuit 176 is provided with input terminals $D_1$ to $D_4$ for respectively receiving the output signals from counter 172 and with input and clock terminals P and CL for respectively receiving the DC voltage $V_B$ from the vehicle battery and the latch signal $d_i$ from timing signal generator 130. The latch circuit 176 latches therein the output signals from counter 172 in response to the latch signal $d_i$ to produce the same at its output terminals $Q_1$ to $Q_4$. The latch circuit 177 is provided with input terminals $D_1$ to $D_4$ for receiving the output signals from counter 173, other constructions of the latch circuit 177 being the same as those of the latch circuit 176. A D-flip flop 178 is provided with an input terminal D for receiving low and high level signals from D-flip flop 175 and with a clock terminal C for receiving the latch signal $d_i$ from timing signal generator 130. Upon receiving the low level signal from D-flip flop 175, D-flip flop 178 produces a high level signal at its output terminal Q in response to the latch signal $d_i$. When received the high level signal from D-flip flop 175, D-flip flop 178 also produces a low level signal therefrom in response to the latch signal $d_i$. In other words, the binary signal from counters 172, 173 is latched and produced by the latch circuits 176, 177 as a binary signal v in response to the latch signal $d_i$, and the high and low level signals from D-flip flop 175 are respectively inverted and produced by D-flip flop 178 as sign signals $v_1$ having low and high levels in response to the latch signal $d_i$.

From the above description, it will be clearly recognized that a vehicle speed $V_s$ satisfies the following equation (1) in relation to the period of time $T_i$ of gate signal $b_i$ from timing signal generator 130.

$$T_i = \beta/V_s \quad (1)$$

where the character $\beta$ indicates a constant. Assuming that the vehicle command-speed upon closure of the set switch 40 is $V_{so}$ and that an actual vehicle speed is $(V_{so} - \Delta V_s)$, a time difference $\Delta T$ is represented by the following equation (2).

$$T = \beta \left( \frac{1}{V_{so} - \Delta V_s} - \frac{1}{V_{so}} \right) \quad (2)$$
$$= \frac{\beta \Delta V_s}{(V_{so} - \Delta V_s) V_{so}}$$
$$\approx \frac{\beta \Delta V_s}{V_{so}^2} \quad (\because V_{so}^2 >> \Delta V_s V_{so})$$

where the character $\Delta V_s$ indicates a difference between the vehicle command-speed $V_{so}$ and the actual vehicle speed. This means that the time difference $\Delta T$ is substantially proportional to the speed difference $\Delta V_s$. Consequently, it should be understood that the binary signal v from the latch circuits 176, 177 indicates the time difference $\Delta T$ corresponding with the speed difference $\Delta V_s$.

Figure 8:
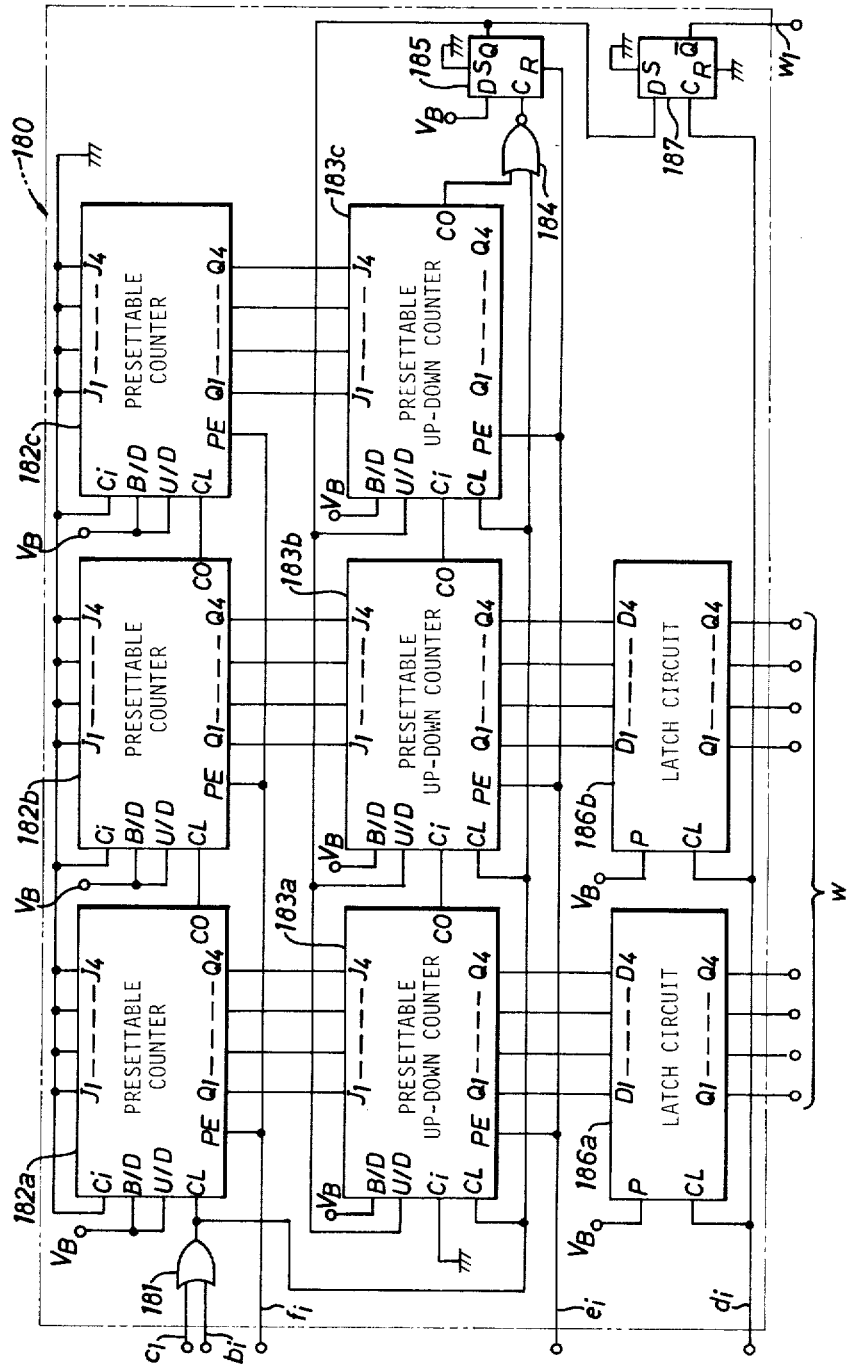
FIG. 8 is a circuit diagram of an embodiment of the acceleration calculation circuit shown in block form in FIG. 1.

FIG. 8 illustrates a preferred embodiment of the acceleration calculation circuit 180 which includes presettable up-down counters 182a, 182b and 182c controlled by an OR-gate 181 and the timing signal generator 130. OR-gate 181 has input terminals for respectively receiving the first clock signals $C_1$ from clock circuit 110 and the gate signal $b_i$ from timing signal generator 130. OR-gate 181 serves to produce a high level signal therefrom in response to the gate and clock signals $b_i$, $C_1$. When the gate signal $b_i$ is low level, OR-gate 181 receives the first clock signals $C_1$ to produce the same therefrom.

The presettable up-down counters 182a, 182b and 182c are respectively of CD 4029 type manufactured by RCA Corporation. Each of the counters 182a, 182b and 182c is provided with input terminals B/D and U/D respectively for receiving the DC voltage from the vehicle battery and with jam input terminals $J_1$ to $J_4$ grounded respectively. This means that each of the counters 182a, 182b and 182c serves to function as a four-bit up counter. The counter 182a is provided with a clock terminal CL for receiving the high level signal and first clock signals $C_1$ from OR-gate 181 and also with a preset-enable terminal PE for receiving the reset signal $f_i$ from timing signal generator 130. When reset by the reset signal $f_i$, the counter 182a produces low level signals respectively at its carry-out and output terminals CO and $Q_1$ to $Q_4$. After released from the reset condition at the trailing edge of reset signal $f_i$, the counter 182a starts to count a series of the first clock signals $C_1$ from OR-gate 181 so as to produce a high level signal at its carry-out terminal CO. When a value counted in the counter 182a reaches the maximum, the counter 182a produces output signals indicative of the maximum value at its output terminals $Q_1$ to $Q_4$ and also produces a low level signal at its carry-out terminal CO. The above-noted operation of counter 182a is repeated during generation of a series of the first clock signals $C_1$ from OR-gate 181 and stopped in response to the high level signal from OR-gate 181.

The presettable counter 182b is provided with a clock terminal CL for receiving the high and low level signals from the carry-out terminal CO of counter 182a and also with a preset-enable terminal PE for receiving the reset signal $f_i$ from timing signal generator 130. When reset by the reset signal $f_i$, the counter 182b produces low level signals respectively at its carry-out and output terminals CO and $Q_1$ to $Q_4$. After released from the reset condition at the trailing edge of reset signal $f_i$, the counter 182b starts to count a series of the high level signals from counter 182a so as to produce a high level signal at its carry-out terminal CO. When a value counted in the counter 182b reaches the maximum, the counter 182b produces output signals indicative of the maximum value respectively at its output terminals $Q_1$ to $Q_4$ and also produces a low level signal at its carry-out terminal CO. The above-noted operation of counter 182b is repeated during generation of a series of the high level signals from counter 182a and stopped when operation of counter 182a is stopped.

The presettable counter 182c is provided with a clock terminal CL for receiving a series of the high level signals from the carry-out terminal CO of counter 182b and also with a preset-enable terminal PE for receiving the reset signal $f_i$ from timing signal generator 130. When reset by the reset signal $f_i$, the counter 182c produces low level signals respectively at its output terminals $Q_1$ to $Q_4$. After release from the reset condition at the trailing edge of reset signal $f_i$, the counter 182c counts a series of the high level signals from counter 182b to produce output signals at its output terminals $Q_1$ to $Q_4$. Upon completing count operation of the counter 182c, all the output signals from counters 182a to 182c are respectively latched and applied to presettable up-down counters 183a to 183c as a binary signal indicative of the period of time $T_i$ of gate signal $b_i$.

The acceleration calculation circuit 180 also includes a NOR-gate 184 which is controlled by the timing signal generator 130 and counter 183c. NOR-gate 184 has input terminals for respectively receiving the high level signal and first clock signals $C_1$ from OR-gate 181 and low and high level signals which will be produced from a carry-out terminal CO of the counte 183c, as described below. NOR-gate 184 produces a low level signal therefrom in response to the high level signal and first clock signals $C_1$ from OR-gate 181 under generation of the high level signal from counter 183c. NOR-gate 184 also produces pulse signals therefrom in response to the first clock signals $C_1$ from OR-gate 181 under generation of the low level signal from counter 183c. The low level and pulse signals from NOR-gate 184 is applied to D-flip flop 185. D-flip flop 185 is provided with an input terminal D for receiving the DC voltage $V_B$ from the vehicle battery and with a clock terminal C for receiving the low level and pulse signals from NOR-gate 184. D-flip flop 185 is also provided with a reset terminal R for receiving the preset signal $e_i$ from timing signal generator 130. When reset by the preset signal $e_i$, D-flip flop 185 produces a low level signal at its output terminal Q. After released from the reset condition at the trailing edge of preset signal $e_i$, D-flip flop 185 produces a high level signal therefrom in response to the pulse signals from NOR-gate 184.

The presettable up-down counters 183a, 183b and 183c are respectively of CD 4029 type manufactured by RCA Corporation. The counter 183a is provided with jam input terminals $J_1$ to $J_4$ for respectively receiving the output signals from counter 182a and with input terminals B/D and U/D for respectively receiving the DC voltage $V_B$ from the vehicle battery and the low and high level signals from D-flip flop 185. The counter 183a is also provided with a clock terminal CL for receiving the high level signal and first clock signals $C_1$ from OR-gate 181 and with a preset-enable terminal PE for receiving the preset signal $e_i$ from timing signal generator 130, a carry-in terminal of counter 183a being grounded. When preset by the signal $e_i$, the counter 183a receives therein the output signals from counter 182a and produces a high level signal at its carry-out terminal CO. After released from the preset condition at the trailing edge of preset signal $e_i$, the counter 183a starts to count down the output signals from counter 182a in accordance with a series of the clock signals $C_1$ from OR-gate 181 under generation of the low level signal from D-flip flop 185. The counter 183a maintains generation of the high level signal therefrom during its count-down operation and produces a low level signal at its carry-out terminal CO when a value counted down in counter 183a reaches zero. This count-down operation in counter 183a is repeated to alternatively generate high and low level signals from the carry-out terminals CO of counter 183a.

In case count-down operation in counter 183a is completed under generation of the low level signal from D-flip flop 185, the counter 183a produces output signals at its output terminals $Q_1$ to $Q_4$ upon completion of its count-down operation. In case the high level signal appears from D-flip flop 185, the counter 183a also starts to count up the remaining first clock signals $C_1$ from OR-gate 181 so as to produce a high level signal at its carry-out terminal CO. Then, the counter 183a maintains generation of the high level signal therefrom during its count-up operation and produces a low level signal at its carry-out terminal CO when a value counted up in counter 183a reaches the maximum. This count-up operation in counter 183a is repeated to alternatively generate high and low level signals from the carry-out terminal CO of counter 183a and is stopped in response to the high level signal from OR-gate 181. When completed count-up operation thereof, the counter 183a produces output signals at its output terminals $Q_1$ to $Q_4$.

The presettable up-down counter 183b is provided with jam input terminals $J_1$ to $J_4$ for receiving the output signals from counter 182b and also with a carry-in terminal $C_i$ for receiving the high and low level signals from counter 183a, other constructions of counter 183b being the same as those of the counter 183a. When preset by the preset signal $e_i$, the counter 183b receives therein the output signals from counter 182b. The counter 183b is also inhibited in its count-down operation due to the high level signal from counter 183a to produce a high level signal at its carry-out terminal CO. When received the low level signal from counter 183a, the counter 183b counts down the output signals from counter 182b in accordance with a series of the first clock signals $C_1$ from OR-gate 181 under generation of the low level signal from D-flip flop 185. This count-down operation in counter 183b is repeated in response to each low level signal from counter 183a under generation of the low level signal from D-flip flop 185 to alternatively produce high and low level signals from the carry-out terminal CO of counter 183b. In case count-down operation in counter 183b is completed under generation of the low level signal from D-flip flop 185, the counter 183b produces output signals at its output terminals $Q_1$ to $Q_4$ upon completion of its count-down operation. In case the high level signal appears from D-flip flop 185, the counter 183b also repetitively counts up the remaining first clock signals $C_1$ from OR-gate 181 in response to each low level signal from counter 183a to alternatively produce high and low level signals at its carry-out terminal CO. When completed count-up operation thereof, the counter 183b produces output signals at its output terminals $Q_1$ to $Q_4$.

The presettable up-down counter 183c is provided with jam input terminals $J_1$ to $J_4$ for receiving the output signals from counter 182c and also with a carry-in terminal $C_i$ for receiving the high and low level signals from counter 183b, other constructions of counter 183c being the same as those of the counter 183a. When preset by the preset signal $e_i$, the counter 183c receives therein the output signals from counter 182c. The counter 183c is also inhibited in its count-down operation due to the high level signal from counter 183b to produce a high level signal at its carry-out terminal CO. When received the low level signal from counter 183a, the counter 183c counts down the output signals from counter 182c in accordance with a series of the first clock signals $C_1$ from OR-gate 181 under generation of the low level signal from D-flip flop 185. This count-down operation in counter 183c is conducted in response to each low level signal from counter 183b under generation of the low level signal from D-flip flop 185 to maintain generation of the high level signal therefrom.

In case a value of the binary signal from counters 182a to 182c is longer than the periods of time $T_i$ of gate signal $b_i$, the counter 183c produces output signals at its output terminals $Q_1$ to $Q_4$ upon completion of its count-down operation and maintains generation of the high level signal at its carry-out terminal CO. In case the value of the binary signal from counters 182a to 182c is shorter than the period of time $T_i$ of gate signal $b_i$, the counter 183c produces a low level signal at its carry-out terminal CO. Then, the counter 183c also counts up the remaining first clock signals $C_1$ from OR-gate 181 in response to each low level signal from counter 183b under generation of the high level signal from D-flip flop 185 to produce output signals at its output terminals $Q_1$ to $Q_4$ upon completion of its count-up operation. In addition, the output signals from the output terminals $Q_1$ to $Q_4$ of counter 183c are neglected because they are considered to be unnecessary in the embodiment.

In summary, in case the value of the binary signal from counter 182a to 182c is shorter than a total period of time of a series of the first clock signals $C_1$ issued from OR-gate 181 within the period of time $T_i$ of gate signal $b_i$, all the counters 183a to 183c count down the value of the binary signal from counter 182a to 182c in accordance with a series of the above-noted first clock signals $C_1$ under generation of the low level signal from D-flip flop 185. The counters 183a, 183b and 183c then count up a remainder of the above-noted first clock signals $C_1$ in response to the high level signal from D-flip flop 185 such that output signals are produced from counters 183a, 183b as a binary signal indicating an absolute value of a time difference between the value of the binary signal from counters 182a to 182c and the total period of time of the above-noted first clock signals $C_1$, the time difference having a negative sign defined by the high level signal from D-flip flop 185. In case the value of the binary signal from counters 182a to 182c is longer than the total period of time of the above-noted first clock signals $C_1$, it it counted down by the counters 183a to 183c in accordance with a series of the above-noted first clock signals $C_1$ under generation of the low level signal from D-flip flop 185. Then, output signals are produced from the counters 183a, 183b as a binary signal indicating an absolute value of another time difference between the value of the binary signal from counters 182a to 182c and the total period of time of the above-noted first clock signals $C_1$, another time difference having a positive sign defined by the low level signal from D-flip flop 185.

The acceleration calculation circuit 180 further includes a pair of latch circuits 186a, 186b which are controlled by the timing signal generator 130. The latch circuit 186a is provided with input terminals $D_1$ to $D_4$ for respectively receiving the output signals from counter 183a and with input and clock temrinals P and CL for respectively receiving the DC voltage $V_B$ from the vehicle battery and the latch signal $d_i$ from timing signal generator 130. The latch circuit 176 latches therein the output signals from counter 183a in response to the latch signal $d_i$ to produce the same at its output terminals $Q_1$ to $Q_4$. The latch circuit 186b is provided with input terminals $D_1$ to $D_4$ for receiving the output signals from counter 182b, other constructions of the latch circuit 186b being the same as those of the latch circuit 186a. A D-flip flop 187 is provided with an input terminal D for receiving low and high level signals from D-flip flop 185 and with a clock terminal C for receiving the latch signal $d_i$ from timing signal generator 130. D-flip flop 187 produces a high level signal at its output terminal $\overline{Q}$ in response to the latch signal $d_i$ and the low level signal from D-flip flop 185. D-flip flop 187 also produces a low level signal therefrom in response to the latch signal $d_i$ and the high level signal from D-flip flop 185. In other words, the binary signal from counters 183a, 183b is latched and produced by the latch circuits 186a, 186b as a binary signal w in response to the latch signal $d_i$, and the high and low level signals from D-flip flop 185 are respectively inverted and produced by D-flip flop 187 as sign signals $w_1$ with low and high levels in response to the latch signal $d_i$.

Figure 9:
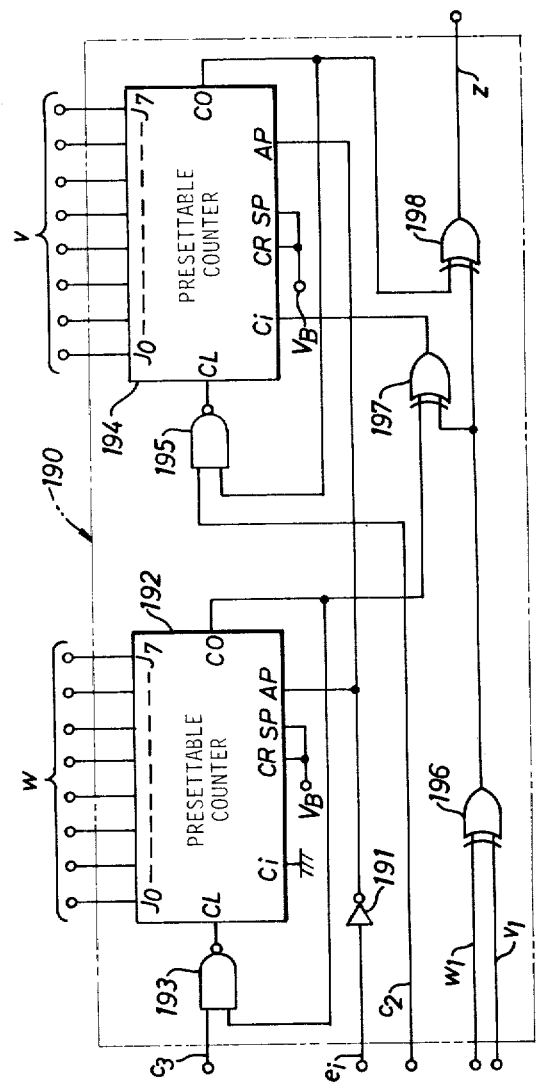
FIG. 9 is a circuit diagram of an embodiment of the correction signal generator shown in block form in FIG. 1.

In FIG. 9, there is illustrated a preferred embodiment of the correction signal generator 190 which includes a presettable down counter 192 controlled by an inverter 191 and a NAND-gate 193. The inverter 191 functions to invert the preset signal $e_i$ from timing signal generator 130. NAND-gate 193 has input terminals for respectively receiving a series of the third clock signals $C_3$ from clock circuit 110 and low and high level signals which will be produced from the counter 192, as described below. NAND-gate 193 produces a pulse signal therefrom sequentially in response to each of the third clock signals $C_3$ during generation of the high level signal from counter 192. When the high level signal from the counter 192 is low level, NAND-gate 193 produces a high level signal therefrom.

The presettable down counter 192 is of CD 40103 type which is manufactured by RCA Corporation. The counter 192 is provided with jam input terminals $J_0$ to $J_7$ for receiving the binary signal w from the latch circuits 186a, 186b and with an asyncronous preset-enable terminal AP for receiving a low level signal from inverter 191. The counter 192 is also provided with a clock terminal CL for receiving the pulse and high level signals from NAND-gate 193 and with clear and synchronous preset-enable terminals CR and SP respectively for receiving the DC voltage $V_B$ from the vehicle battery, a carry-in terminal $C_i$ of counter 192 being grounded. When received the binary signal w in response to the low level signal from inverter 191, the down counter 192 serves to preset therein the binary signal w. When the low level signal from inverter 191 becomes high level, the counter 192 starts to count down a value of the binary signal w in accordance with a series of the pulse signals from NAND-gate 193. Then, the counter 192 produces a high level signal at its carry-out terminal CO during count operation thereof. When counted the value of binary signal w down to zero, the counter 192 produces a low level signal at its carry-out terminal CO, the count operation of counter 192 being stopped in response to the high level signal from NAND-gate 193. The above-noted operation in counter 192 is repeated in response to each preset signal $e_i$ from timing signal generator 130 such that a high level signal with a width corresponding to the value of binary signal w is repetitively produced from the carry-out terminal CO of counter 192.

The correction signal generator 190 also includes an exclusive OR-gate 197 which is controlled by the counter 192 and an exclusive OR-gate 196. The exclusive OR-gate 196 has input terminals for respectively receiving the sign signals $v_1$ and $w_1$ from the speed-differential and acceleration calculation circuit 170 and 180. The exclusive OR-gate 196 porduces a low level signal therefrom when each of the sign signals $v_1$ and $w_1$ has low or high level. The exclusive OR-gate 196 produces a high level signal therefrom when one of the sign signals $v_1$ and $w_1$ has high level and the other sign signal has low level. In other words, the exclusive OR-gate 196 produces the high level signal when each sign of the sign signals $v_1$ and $w_1$ is identical to each other. The exclusive OR-gate 196 also produces the low level signal when each sign of the sign signals $v_1$ and $w_1$ is opposite to each other. The exclusive OR-gate 197 has input terminals respectively for receiving the high and low level signals from each of the down counter 192 and exclusive OR-gate 196. The exclusive OR-gate 197 produces a low level signal therefrom in response to the low or high level signal from the counter 192 and exclusive OR-gate 196. The low level signal from exclusive OR-gate 197 becomes high level when one of the counter 192 and exclusive OR-gate 196 produces a low level signal and the other produces a high level signal.

The correction signal generator 190 further includes a presettable down counter 194 which is controlled by the exclusive OR-gate 197 and a NAND-gate 195. NAND-gate 195 has input terminals for receiving a series of the second clock signals $C_2$ from clock circuit 110 and high and low level signals which will be produced from the counter 194, as described below. NAND-gate 195 produces a pulse signal therefrom sequentially in response to each of the second clock signals $C_2$ during generation of the high level signal from the counter 194. When the high level signal from the counter 194 is low level, NAND-gate 195 produces a high level signal therefrom.

The presettable down counter 194 is of CD 40103 type which is manufactured by RCA Corporation. The counter 194 is provided with jam input terminals $J_0$ to $J_7$ for receiving the binary signal v from the latch circuits 176, 177 and with an asynchronous preset-enable terminal AP for receiving the low level signal from inverter 191. The counter 194 is also provided with clock and carry-in terminals CL and $C_i$ for respectively receiving the pulse and high level signals from NAND-gate 195 and the low and high level signals from exclusive OR-gate 197 and with clear and synchronous preset-enable terminal CR and SP respectively for receiving the DC voltage $V_B$ from the vehicle battery.

When received the binary signal v in response to the low level signal from inverter 191, the down counter 194 serves to preset therein the binary signal v, count operation of counter 194 being inhibited due to the high level signal from exclusive OR-gate 197. The counter 194 starts to count down a value of the binary signal v sequentially in response to each of the pulse signals from NAND-gate 195 when each of the low and high level signals respectively from the inverter 191 and exclusive OR-gate 197 is inverted. During count operation thereof, the counter 194 produces a high level signal at its carry-out terminal CO. When counted the value of the binary signal v down to zero, the counter 194 produces a low level signal at its carry-out terminal CO, the count operation of counter 194 being stopped in response to the high level signal from NAND-gate 195. The above-noted operation of counter 194 is repeated in response to each preset signal $e_i$ from timing signal generator 130 such that a high level signal with a width corresponding to the value of binary signal v is repetitively produced from the carry-out terminal CO of counter 194.

An exclusive OR-gate 198 has input terminals for respectively receiving the low and high level signals from each of the counter 194 and exclusive OR-gate 196. The exclusive OR-gate 198 produces a low level signal therefrom when each of the counter 194 and exclusive OR-gate 196 produces a low or high level signal. The exclusive OR-gate 198 also produces a high level signal therefrom when one of the counter 194 and exclusive OR-gate 196 produces a low level signal and the other produces a high level signal.

In summary, if the sign signals $v_1$ and $w_1$ have the identical sign to each other, the counter 194 is inhibited in its count operation under control by the counter 192 and exclusive OR-gates 196, 197 to produce the high level signal therefrom. Upon completing count operation in counter 192, the counter 194 starts to cound down the value of binary signal v so as to maintain generation of the high level signal therefrom. Upon completing count operation thereof, the counter 194 produces the low level signal therefrom. Thus, the exclusive OR-gate 198 produces the high level signal therefrom as a correction signal z with a width $\tau$ corresponding to a sum of the values of binary signals v and w. If the sign signals $v_1$ and $w_1$ have the opposite signs to each other, the counters 192, 194 simultaneously start to respectively count down the values of binary signals w and v upon appearance of each low level signal from the inverter 191 and exclusive OR-gate 197. At this stage, the correction signal z from exclusive OR-gate 198 is low level due to the high level signals from the counter 194 and exclusive OR-gate 196. In case count operation of counter 194 is completed prior to that of counter 192, the counter 194 produces therefrom the low level signal upon completion of its count operation to render the correction signal z high level. When completed count operation thereof, the counter 192 produces the low level signal therefrom, and the counter 194 also produces the high level signal due to the low and high level signals from counter 192 and exclusive OR-gate 197 to render the correction signal z low level. This means that the width $\tau$ of the correction signal z corresponds with a difference of the values of binary signals w and v. Additionally, in case count operation in counter 192 is completed prior to that of counter 194, the correction signal z from exclusive OR-gate 198 is maintained low level due to the high level signals from the counter 198 and exclusive OR-gate 196.

Figure 10:
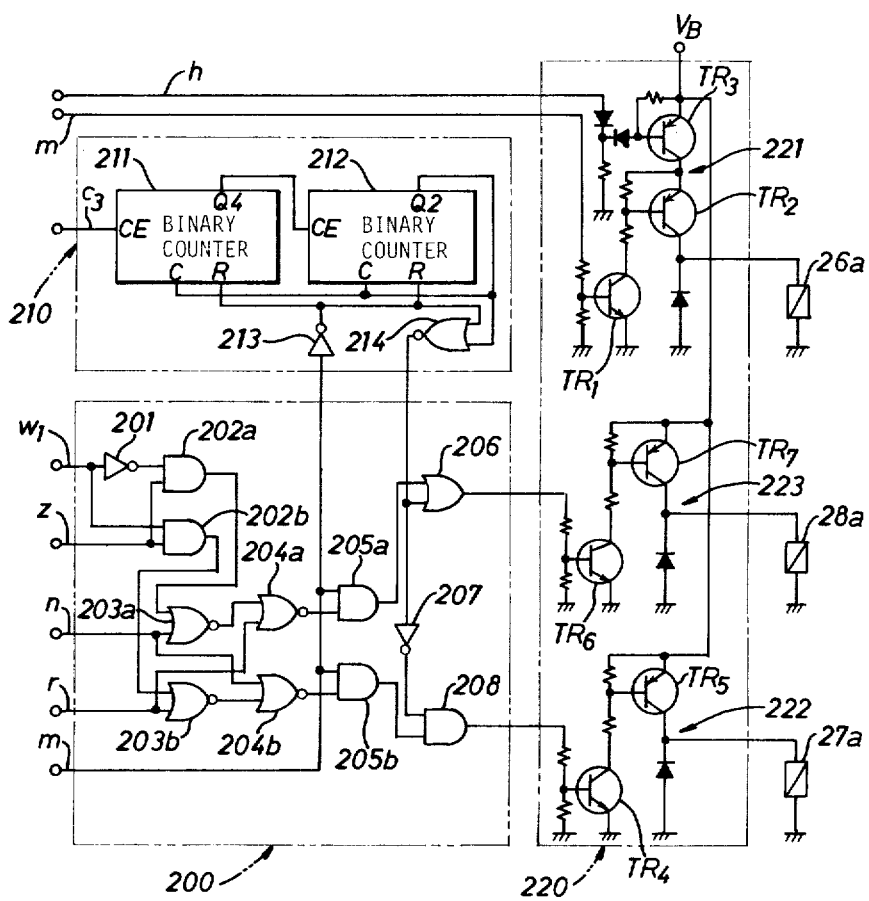
FIG. 10 is circuit diagrams of embodiments of the distribution circuit, initialization signal generator and drive circuit respectively shown in block form in FIG. 1.

In FIG. 10, there are respectively illustrated preferred embodiments of the distribution circuit 200, initialization signal generator 210 and drive circuit 220. The initialization signal generator 210 includes an inverter 213 and a pair of binary counters 211, 212. The inverter 213 functions to invert the operation signal m from control signal generator 140. The binary counter 211 is of CD 4520 type manufactured by RCA Corporation and is provided with a clock-enable terminal CE for receiving a series of the third clock signals $C_3$ from clock circuit 110. The counter 211 is also provided with a reset terminal R for receiving an inverted output signal from inverter 213 and with a clear terminal C for receiving a high level signal which will be produced from the counter 212. When reset by the inverted output signal from inverter 213, the counter 211 produces a low level signal at its output terminal $Q_4$. When the inverted output signal from inverter 213 becomes low level, the counter 211 starts to count a series of the third clock signals $C_3$. When a value counted in counter 211 reaches a number of 16, the low level signal from counter 211 becomes high level. The above-noted operation of counter 211 is twice repeated to produce two high level signals from the counter 211 in sequence and is stopped by the high level signal from counter 212.

The binary counter 212 is provided with a clock-enable terminal CE for receiving the high level signals from the output terminal $Q_4$ of counter 211, other constructions of counter 212 being the same as those of counter 211. When reset by the inverted output signal from inverter 213, the counter 212 produces a low level signal at its output terminal $Q_2$. When the inverted output signal from inverter 213 becomes low level, the counter 212 starts to count the high level signals from counter 211. When a value counted in counter 211 reaches a number of 32, the counter 212 produces a high level signal at its output terminal $Q_2$, count operation of counter 212 being stopped by the same high level signal. In other words, the high level signal is produced from the counter 212 with lapse of time of about 0.5 seconds after start of count in the counter 211. NOR-gate 214 has input teminals for receiving the inverted output signal from inverter 213 and the low and high level singals from the output terminal $Q_4$ of counter 212. NOR-gate 214 produces a high level signal therefrom in response to the low level signal from counter 212 when the inverted output signal from inverter 213 is low level. The high level signal from NOR-gate 214 is used as one necessary for setting an opening degree of the throttle valve 12 in an initial value corresponding to the command speed of the vehicle. When one of the low level and inverted output signals respectively from counter 212 and inverter 213 becomes high level, NOR-gate 214 also produces a low level signal therefrom. This means that the high level signal from NOR-gate 214 is applied to the distribution circuit 200 as an initialization signal with a width defined by about 0.5 seconds.

The distribution circuit 200 comprises an AND-gate 202a which is controlled by an inverter 201 and the correction signal generator 190. The inverter 201 functions to invert the sign signal $w_1$ from acceleration calculation circuit 180. AND-gate 202a has input terminals respectively for receiving an inverted output signal from inverter 201 and the correction signal z from correction signal generator 190. When the inverted output signal from inverter 201 is high level, AND-gate 202a produces a high level signal therefrom in response to the correction signal z. AND-gate 202a also produces a low level signal therefrom when one of the correction signal z and the inverted output signal from inverter 201 is low level. The high and low level signals from AND-gate 202a are respectively applied to a NOR-gate 203a. An AND-gate 202b has input terminals respectively for receiving the sign signal $w_1$ and the correction signal z. When the sign signal $w_1$ is high level, AND-gate 202b produces a high level signal therefrom in response to the correction signal z. When one of the sign and correction signals $w_1$ and z is low level, AND-gate 202b also produces a low level signal therefrom. The high and low level signals from AND-gate 202b are respectively applied to a NOR-gate 203b.

NOR-gate 203a has input terminals for respectively receiving the high and low level signals from AND-gate 202a and the acceleration signal n from control signal generator 140. NOR-gate 203a produces a low level signal therefrom in response to one of the acceleration signal n and the high level signal from AND-gate 202a. When each of the acceleration signal n and the high level signal from AND-gate 202a is low level, NOR-gate 203a also produces a high level signal therefrom. Meanwhile, NOR-gate 203b has input terminals for respectively receiving the low and high level signals from AND-gate 202b and the deceleration signal r from control signal generator 140. NOR-gate 203b produces a low level signal therefrom in response to one of the deceleration signal r and the high level signal from AND-gate 202b. When each of the deceleration signal r and the high level signal from AND-gate 202b is low level, NOR-gate 203b also produces a high level signal therefrom.

The distribution circuit 200 also comprises NOR-gates 204a, 204b and AND-gates 205a, 205b. NOR-gate 204a has input terminals for respectively receiving the low and high level signals from NOR-gate 203a and the deceleration signal r from control signal generator 140. NOR-gate 204a produces a low level signal therefrom in response to one of the deceleration signal r and the high level signal from NOR-gate 203a. When each of the deceleration signal r and the high level signal from NOR-gate 203a is low level, NOR-gate 204a also produces a high level signal therefrom. Meanwhile, NOR-gate 204b has input terminals for respectively receiving the acceleration signal n from control signal generator 140 and the low and high level signals from NOR-gate 203b. NOR-gate 204b produces a low level signal therefrom in response to one of the acceleration signal n and the high level signal from NOR-gate 203b. When each of the acceleration signal n and the high level signal from NOR-gate 203b is low level, NOR-gate 204b produces a high level signal therefrom.

AND-gate 205a has input terminals for respectively receiving the operation signal m from control signal generator 140 and the high and low level signals from NOR-gate 204a. AND-gate 205a produces a high level signal therefrom in response to the operation signal m and the high level signal from NOR-gate 204a. When one of the operation signal m and the high level signal from NOR-gate 204a is low level, AND-gate 205a produces a low level signal therefrom. The low and high level signals from AND-gate 205a are respectively applied to OR-gate 206. Meanwhile, AND-gate 205b has input terminals for respectively receiving the operation signal m and the low and high level signals from NOR-gate 204b. AND-gate 205b produces a high level signal therefrom in response to the operation signal m and the high level signal from NOR-gate 204b. When one of the operation signal m and the high level signal from NOR-gate 204b is low level, AND-gate 205b also produces a low level signal therefrom. The low and high level signals from AND-gate 205b are applied to an AND-gate 208.

OR-gate 206 is provided with input terminals for respectively receiving the low and high level signals from AND-gate 205a and the initialization signal from NOR-gate 214. OR-gate 206 produces therefrom a high level signal as the first distribution signal in response to one of the high level and initialization signals respectively from AND-gate 205a and NOR-gate 214. When each of the high level and initialization signals from AND-gate 205a and NOR-gate 214a is low level, OR-gate 206 also produces a low level signal therefrom. AND-gate 208 is provided with input terminals for respectively receiving the low and high level signals from AND-gate 205b and an inverted output signal from an inverter 207. The inverter 207 produces the inverted output signal in response to the initialization signal from NOR-gate 214. When the inverted output signal from inverter 207 is high level, AND-gate 208 produces therefrom a high level signal as the second distribution signal in response to the high level signal from AND-gate 205b. When one of the inverted output signal from inverter 207 and the high level signal from AND-gate 205b is low level, AND-gate 208 also produces a low level signal therefrom.

The drive circuit 220 is provided with a first transistor circuit 221 which includes three transistors $TR_1$, $TR_2$ and $TR_3$. The transistor $TR_3$ has a collector for receiving the DC voltage $V_B$ from the vehicle battery and a base for receiving the release signal h from cancel switch 50 through a pair of diodes. The base of transistor $TR_3$ is connected through a resistor to the vehicle battery and also grounded through the diode and a resistor. The transistor $TR_3$ is turned on when the cancel switch 50 is opened. Upon appearance of the release signal h from cancel switch 50, the transistor $TR_3$ is turned off. The transistor $TR_1$ is provided with a collector for receiving the DC voltage $V_B$ from the vehicle battery through a pair of resistors and the transistor $TR_3$ and with a base for receiving the operation signal m from control signal generator 140 through a resistor, the base of transistor $TR_1$ being grounded through a resistor. Under conduction of the transistor $TR_3$, the transistor $TR_1$ is turned on in response to the operation signal m. The transistor $TR_1$ is turned off when the transistor $TR_3$ becomes non-conductive. The transistor $TR_1$ is also turned off when the operation signal m becomes low level.

The transistor $TR_2$ is provided with an emitter for receiving the DC voltage $V_B$ from the vehicle battery through the transistor $TR_3$ and with a collector connected to the solenoid 26a of solenoid valve 26. The base of transistor $TR_2$ is connected to the vehicle battery through the resistor and transistor $TR_3$ and also grounded through the resistor and transistor $TR_1$. Under conduction of transistor $TR_3$, the transistor $TR_2$ is turned on in response to conduction of transistor $TR_1$ to produce a high level signal at its collector as the above-noted first output signal. When one of the transistors $TR_1$, $TR_3$ is turned off, the first output signal from transistor $TR_2$ becomes low level. As understood from the above-description, all the transistors $TR_1$ to $TR_3$ are turned on in response to the operation signal m under opening of the cancel switch 50 such that the first output signal is produced from the transistor $TR_2$. The transistors $TR_1$ to $TR_3$ are also turned off in response to the release signal h from cancel switch 50 to render the first output signal low level. When the operation signal m becomes low level, the transistor $TR_1$ to $TR_3$ are also turned off to render the first output signal low level.

The drive circuit 220 is also provided with second and third transistor circuits 222 and 223 which are respectively controlled by the distribution circuit 200. The second transistor circuit 222 includes a transistor $TR_4$ which has a base for receiving the low and high level signals from AND-gate 208 through a resistor, the base of transistor $TR_4$ being grounded through a resistor. The transistor $TR_4$ also has a collector for receiving the DC voltage $V_B$ from the vehicle battery through a pair of resistors. The transistor $TR_4$ is turned on in response to the high level or second distribution signal from AND-gate 208 and also turned off in response to the low level signal from AND-gate 208. A transistor $TR_5$ has an emitter for receiving the DC voltage $V_B$ from the vehicle battery, a collector of transistor $TR_5$ being connected to the solenoid 27a of solenoid valve 27. The transistor $TR_5$ also has a base for receiving the DC voltage $V_B$ from the vehicle battery through the resistor, the base of transistor $TR_5$ being grounded through the resistor and transistor $TR_4$. The transistor $TR_5$ is turned on due to conduction of transistor $TR_4$ to produce a high level signal at its collector as the above-noted second output signal. The transistor $TR_5$ is also turned off due to non-conduction of transistor $TR_4$ to render the second output signal low level.

The third transistor circuit 223 includes a transistor $TR_6$ which has a base for receiving the low and high level signals from OR-gate 206 through a resistor, the base of transistor $TR_6$ being grounded through a resistor. The transistor $TR_6$ also has a collector for receiving the DC voltage $V_B$ from the vehicle battery through a pair of resistors. The transistor $TR_6$ is turned on in response to the high level or first distribution signal from OR-gate 206 and also turned off in response to the low level signal from OR-gate 206. A transistor $TR_7$ is provided with an emitter for receiving the DC voltage $V_B$ from the vehicle battery, a collector of transistor $TR_7$ being connected to the solenoid 28a of solenoid valve 28. The transistor $TR_7$ is also provided with a base for receiving the DC voltage $V_B$ from the vehicle battery through the resistor, the base of transistor $TR_7$ being grounded through the resistor and transistor $TR_6$. The transistor $TR_7$ is turned on due to conduction of transistor $TR_6$ to produce a high level signal at its collector as the above-noted third output signal. The transistor $TR_7$ is also turned off due to non-conduction of transistor $TR_6$ to render the first output signal low level.

OPERATION

When the vehicle starts to travel on a flat road upon depression of an accelerator pedal (not shown) and the speed control system is ready for operation, the solenoid valve 26 opens to permit supply of the atmospheric pressure from the exterior into the servo-chamber 23 of servomotor 20 through conduit $P_1$. Meanwhile, the solenoid valve 27 closes to block supply of the atmospheric pressure through conduit $P_2$ from the exterior into the servo-chamber 23, and the solenoid valve 28 also closes to block supply of the negative pressure through conduit $P_3$ from the induction passage 11 into the servo-chamber 23.

At the above-mentioned stage, each series of first, second and third clock signals $C_1$, $C_2$ and $C_3$ is produced from the clock circuit 110 in sequence. A series of the first clock signals $C_1$ are applied to the timing signal generator 130 and cancellation circuit 150 and further applied to the command-speed set circuit 160 and acceleration calculation circuit 180. A series of the second clock signals $C_2$ are applied to the correction signal generator 190, and a series of the third clock signals $C_3$ are applied to the correction signal generator 190 and initialization signal generator 210. An actual speed of the vehicle is repetitively detected by the speed sensor 30 to produce a series of electric signals respectively with a frequency proportional to the actual vehicle speed. Each of the electric signals from speed sensor 30 is reshaped by the wave shaper 120 and then applied to the timing signal generator 130 as a rectangular pulse signal a (see FIG. 3). Then, the counter 132 of timing signal generator 130 is repetitively reset in response to each of high level signals, which will be produced from RS-flip flop 131 as previously described, and counts a series of the pulse signals a after release of each reset condition to repetitively produce therefrom a gate signal $b_i$ with a period of time $T_i$. Each gate signal $b_i$ is sequentially applied to D-flip flop 133 and also to the cancellation circuit 150, command-speed set circuit 160 and acceleration calculation circuit 180. Subsequently, D-flip flop 133 is reset by each of the high level signals from RS-flip flop 131 to repetitively produce a high level signal therefrom. The counter 134 is also reset by each of the high level signals from RS-flip flop 131 and counts a series of the first clock signals $C_1$ under generation of each high level signal from D-flip flop 133 to repetitively produce therefrom latch, preset and reset signals $d_i$, $e_i$ and $f_i$ in sequence.

When the set switch 40 is temporarily closed at a desired or command speed of the vehicle, a set signal c is produced from the set switch 40 and applied to the control signal generator 140 (see FIGS. 1 and 4). Then, NAND-gate 141 of control signal generator 140 produces a high level signal therefrom in response to the set signal c so that RS-flip flop 142 produces therefrom a low level signal $i_1$ to be applied to D-flip flop 143a. Assuming that immediately after closure of set switch 40, the timing signal generator 130 produces therefrom a gate signal $b_1$ with a period of time $T_1$ and produces latch, preset and reset signals $d_1$, $e_1$ and $f_1$ in sequence, as previously described, the gate signal $b_1$ is applied to the cancellation circuit 150, command-speed set circuit 160 and acceleration caclulation circuit 180, and the latch signal $d_1$ is applied to the control signal generator 140, cancellation circuit 150, speed-differential and acceleration calculaton circuits 170 and 180. The preset signal $e_1$ is also applied to the control signal generator 140, speed-differential and acceleration calculation circuits 170 and 180 and correction signal generator 190, and the reset signal $f_1$ is applied to the control signal generator 140, cancellation circuit 150, command-speed set circuit 160 and acceleration calculation circuit 180.

When D-flip flop 143a of control signal generator 140 receives the preset and low level signals $e_1$, $i_1$ respectively from timing signal generator 130 and RS-flip flop 142 after reset by the power-on reset circuit 145a, it produces therefrom a command-speed signal $j_1$ (see FIG. 5) which is applied to D-flip flop 143b and the command-speed set circuit 160. Then, the low level signal $i_1$ from RS-flip flop 142 becomes a high level signal $i_2$ in response to the reset signal $f_1$ from timing signal generator 130. The binary counter 153 of cancellation circuit 150 is also reset by the reset signal $f_1$ and starts to count a series of the first clock signals $C_1$ through NOR-gates 151, 152 at a trailing edge of gate signal $b_1$. In the command-speed set circuit 160, the up counters 164, 165 and 166 are simultaneously reset by AND-gate 163 in response to the reset and command-speed signals $f_1$ and $j_1$ respectively from timing and control signal generators 130 and 140 and start to count a series of the first clock signals $C_1$ through NOR-gate 161 and AND-gate 162 within a width of the command-speed signal $j_1$, as previously described. In the acceleration calculation circuit 180, the up counters 182a, 182b and 182c are also simultaneously reset by the reset signal $f_1$ and start to count a series of the first clock signals $C_1$ through OR-gate 181 at the trailing edge of gate signal $b_1$.

When a gate signal $b_2$ with the period of time $T_1$ of gate signal $b_1$ and latch, preset and reset signals $d_2$, $e_2$ and $f_2$ following the gate signal $b_1$ are sequentially produced from the timing signal generator 130, as previously described, each count operation of the counters 153, 164 to 166 and 182a to 182c of circuits 150, 160 and 180 is completed at a leading edge of gate signal $b_2$. Then, the counter 153 produces high level signals respectively at its output terminals $Q_9$, $Q_{10}$ upon the completion of count, and AND-gate 155 produces a high level signal in response to the high level signals from counter 153 to generate a high level signal from D-flip flop 156. The counters 164 to 166 produce therefrom a binary signal u indicative of the period of time $T_1$ of gate signal $b_1$ upon the completion of count, the binary signal u being applied to the speed-differential calculation circuit 170. The counters 182a to 182c also produce therefrom a binary signal indicative of the period of time $T_1$ of gate signal $b_1$ upon the completion of count to apply the same to the up-down counters 183a to 183c. When D-flip flop 143b of control signal generator 140 receives the latch signal $d_2$ from timing signal generator 130 after reset by the power-on reset circuit 145a, the command-speed signal $j_1$ is inverted by D-flip flop 143b and applied to D-flip flop 143c as a low level signal k (see FIG. 5). In the cancellation circuit 150, the high level signal from D-flip flop 156 is latched by D-flip flop 157 in response to the latch signal $d_2$ and inverted as a low level signal to the control signal generator 140. This means that a release signal s from cancellation circuit 152 is applied to the control signal generator 140 as the low level signal for maintaining operation of the speed control system.

When the preset signal $e_2$ from timing signal generator 130 is applied to D-flip flop 143a of control signal generator 140, the command-speed signal $j_1$ is inverted by D-flip flop 143a into a low level signal. At this stage, the binary signal u is still stored in the presettable up counters 164 to 166 of command-speed set circuit 160. When the preset signal $e_2$ from timing signal generator 130 is also applied to the speed-differential and acceleration calculation circuits 170 and 180, the up-down counters 171 to 173 of calculation circuit 170 preset therein the binary signal u from command-speed set circuit 160 and starts to count down a value of binary signal u at a trailing edge of gate signal $b_2$ in accordance with a series of the first clock signals $C_1$ from NOR-gate 161. Simultaneously, the up-down counters 183a to 183c of calculation circuit 180 preset therein the binary signal from counters 182a to 182c and starts to count down a value of the same binary signal at the trailing edge of gate signal $b_2$ in accordance with a series of the first clock signals $C_1$. When the gate and reset signals $b_2$ and $f_2$ from timing signal generator 130 are applied to the cancellation circuit 150 and acceleration calculation circuit 180, each of the counters 153 and 182a to 182c is reset by the reset signal $f_2$ and again starts to count a series of the first clock signals $C_1$ at the trailing edge of gate signal $b_2$.

When a gate signal $b_3$ with the period of time $T_1$ of gate signal $b_1$ and latch, preset and reset signals $d_3$, $e_3$ and $f_3$ following the gate signal $b_2$ are sequentially produced from the timing signal generator 130, as previously described, each count operation of the counters 153 and 171 to 173 of circuits 150 and 170 is completed at a leading edge of gate signal $b_3$, and simultaneously each count operation of the counters 182a to 182c and 183a to 183c of circuit 180 is completed. Then, the counter 153 again produces high level signals at its output terminals $Q_9$, $Q_{10}$ upon the completion of count to generate a high level signal from D-flip flop 156 under control by AND-gate 155. The counters 172 and 173 produce a binary signal indicative of zero value upon the completion of count to apply the same to the latch circuits 176 and 177. Furthermore, the counters 182a to 182c again produce another binary signal indicative of the period of time $T_1$ of gate signal $b_2$ upon the completion of count to apply the same to the up-down counters 183a to 183c, and the counters 183a and 183b produce a binary signal indicative of zero value upon the completion of count to apply the same to the latch circuits 186a and 186b.

When the latch signal $d_3$ from timing signal generator 130 is applied to the control signal generator 140 and cancellation circuit 150, the low level signal k is inverted by D-flip flop 143b into a high level signal which is applied to D-flip flop 143c. Then, D-flip flop 143c produces therefrom an operation signal m in response to the high level signal from D-flip flop 143b after reset by OR-gate 145. The operation signal m is then applied to the distribution circuit 200, initialization signal generator 210 and drive circut 220. D-flip flop 157 of cancellation circuit 150 again produces a low level signal therefrom in response to the latch signal $d_3$. When the latch signal $d_3$ is also applied to the speed-differential and acceleration calculation circuits 170 and 180, the binary signal from counters 172, 173 is latched by the latch circuits 176, 177 and applied to the correction signal generator 190 as a binary signal v indicative of the zero value. Simultaneously, the binary signal from counters 183a, 183b is latched by the latch circuits 186a, 186b and applied to the correction signal generator 190 as a binary signal w indicative of the zero value.

When the operation signal m from control signal generator 140 is applied to the initialization signal generator 210 and the distribution and drive circuits 200 and 220, as previously described, the transistors $TR_1$ to $TR_3$ of drive circuit 220 are turned on so that a first output signal is produced from the transistor $TR_2$ and applied to the solenoid 26a of solenoid valve 26. Furthermore, the counters 211, 212 of signal generator 120 are reset by the inverter 213 in response to the operation signal m and starts to count a series of the third clock signals $C_3$ from clock circuit 110. NOR-gate 214 of signal generator 210 also produces an initialization signal therefrom under control by the inverter 213 in response to the operation signal m. The initialization signal from NOR-gate 214 is applied to the third transistor circuit 223 of drive circuit 220 through OR-gate 206 of distribution circuit 200 as a first distribution signal. Then, the transistors $TR_6$, $TR_7$ are turned on due to the first distribution signal from OR-gate 206 so that a third output signal is produced from the transistor $TR_7$ and applied to the solenoid 28a of solenoid valve 28.

When the solenoids 26a and 28a are energized due to the first and third output signals from transistors $TR_2$ and $TR_7$ respectively, the solenoid valve 26 is closed to block supply of the atmospheric pressure from the exterior into the servo-chamber 23 of servomotor 20, whereas the solenoid valve 28 is opened to permit supply of negative pressure from the induction passage 11 into the servo-chamber 23. In other words, this means that the servo-chamber 23 is supplied with negative pressure which is issued from the induction passage 11 in accordance with rotational speed of the engine defining the command speed of the vehicle. Thus, the diaphragm 22 of servomotor 20 is displaced toward the servo-chamber 23 against resilient force of spring 25. At this stage, the correction signal generator 190 produces a low level signal therefrom due to each zero value of the binary signals v and w to generate a low level signal respectively from AND-gates 205a, 208 of distribution circuit 200. Thus, the solenoid 27a of solenoid valve 27 is maintained in its deenergization under control by the second transistor circuit 222 of drive circuit 220 in response to the low level signal from AND-gate 208.

When a count value in counters 211, 212 reaches the number of 32, the counter 212 produces a high level signal therefrom to render the initialization signal from NOR-gate 214 low level. Then, the transistors $TR_6$, $TR_7$ are turned off by OR-gate 206 in response to the low level signals from AND-gate 205a and NOR-gate 214 so that the solenoid valve 28 is closed due to deenergization of solenoid 28a to block the supply of negative pressure from induction passage 11 into the servo chamber 23. Thus, displacement of the diaphragm 22 of servomotor 20 is ceased to maintain an opening angle of throttle valve 12 in an initial value. In other words, this means that the initial throttle opening angle is maintained by an amount of negative pressure which is applied from the induction passage 11 into the servo-chamber 23 within the width of the initialization signal at an engine rotation corresponding with the desired vehicle speed. Thereafter, the above-noted operation of the speed control system is substantially repeated to maintain the actual vehicle speed in the command or desired speed under each closure of the solenoid valves 26 to 28.

When loads against the vehicle increase under this condition, the actual speed of the vehicle starts to decrease. Then, the decreasing vehicle speed is detected and produced by the speed sensor 30 as a series of electric signals respectively with a frequency proportional to the decreasing vehicle speed. Each of the electric signals from speed sensor 30 is reshaped by the wave shaper 120 and sequentially applied to the timing signal generator 130 as a rectangular pulse signal a. When the timing signal generator 130 produces a gate signal $b_m$ with a period of time $T_m$ and produces latch, preset and reset signals $d_m$, $e_m$ and $f_m$ in sequence, as previously described, the gate signal $b_m$ is applied to the calculation circuit 150, command-speed set circuit 160 and acceleration calculation circuit 180, and the latch signal $d_m$ is applied to the control signal generator 140 and circuits 150, 170, 180. The preset signal $e_m$ is also applied to the control and correction signal generators 140, 190 and calculation circuits 170, 180, and the reset signal $f_m$ is applied to the control signal generator 140 and circuits 150, 160 and 180. In addition, the period of time $T_m$ of gate signal $b_m$ is longer than the period of time $T_1$ of gate signal $b_1$. The period of time $T_m$ is assumed to be longer than a period of time $T_{m-1}$ of a gate signal $b_{m-1}$ prior to the gate signal $b_m$.

When the preset signal $e_m$ from timing signal generator 130 is applied to the speed-differential and acceleration calculation circuits 170, 180, as previously described, the counters 171 to 173 of calculation circuit 170 preset therein the binary signal u from command-speed set circuit 160 and start to count down the value of binary signal u at a trailing edge of gate signal $b_m$ in accordance with a series of the first clock signals $C_1$. Simulataneously, the counters 183a to 183c of calculation circuit 180 preset therein a binary signal indicative of the period of time $T_{m-1}$ of gate signal $b_{m-1}$ which was previously issued from timing signal generator 130. Then, the counters 183a to 183c start to count down the period of time $T_{m-1}$ of the same binary signal at the trailing edge of gate signal $b_m$ in accordance with a series of the first clock signals $C_1$. When the reset signal $f_m$ from timing signal generator 130 is applied to the acceleration calculation circuit 180, as previously described, the counters 182a to 182c start to count a series of the first clock signals $C_1$ at the trailing edge of gate signal $b_m$. In addition, the control signal generator 140 maintains generation of the operation signal m therefrom and the calculation circuit 150 also maintains generation of the low level signal therefrom, as previously described.

When each of the counters 173 and 183c produces a low level signal at its carry-out terminal CO upon completion of each count-down operation in counters 171 to 173 and 183a to 183c, D-flip flop 175 of calculation circuit 170 produces a high level signal therefrom under control by NOR-gate 174 in response to the low level signal from counter 173. D-flip flop 185 of calculation circuit 180 also produces a high level signal therefrom under control by NOR-gate 184 in response to the low level signal from counter 183c. When the counters 171 to 173 and 183a to 183c receive the high level signals from D-flip flop 175 and 185 respectively, each of them counts up each of the remaining first clock signals $C_1$ defined by the period of time $T_m$ of gate signal $b_m$. At this stage, the high level signals from D-flip flop 175 and 185 are also applied to D-flip flop 178 and 187 respectively.

When a gate signal $b_{m+1}$ with a period of time $T_{m+1}$ and latch, preset and reset signals $d_{m+1}$, $e_{m+1}$ and $f_{m+1}$ following the gate signal $b_m$ are produced from the timing signal generator 130, as previously described, each count-up operation of the counters 171 to 173 and 183a to 183c is completed at a leading edge of gate signal $b_{m+1}$. Then, a binary signal indicative of a first time difference $|T_1 - T_m|$ is produced from the counters 172, 173 and applied to the latch circuits 176, 177. This means that the binary signal from counters 172, 173 is applied to the latch circuits 176, 177 as a binary signal indicative of actual speed difference of the vehicle corresponding with the first time difference $|T_1-T_m|$. Simultaneously, a binary signal indicative of a second time difference $|T_{m-1}-T_m|$ is produced from the counters 183a, 183b and applied to the latch circuits 186a, 186b. This means that the binary signal from counters 183a, 183b is applied to the latch circuits 186a, 186b as a binary signal indicative of actual acceleration of the vehicle corresponding with the second time difference $|T_{m-1}-T_m|$. Subsequently, the binary signal from counters 172, 173 is latched and applied by the latch circuits 176, 177 to the correction signal generator 190 as a binary signal v in response to the latch signal $d_{m+1}$, and simultaneously the high level signal from D-flip flop 175 is inverted by D-flip flop 178 and applied to the correction signal generator 190 as a sign signal $v_1$ with low level or negative sign. The binary signal from counters 183a, 183b is also latched and applied by the latch circuits 186a, 186b to the correction signal generator 190 as a binary signal w in response to the latch signal $d_{m+1}$, and simultaneously the high level signal from D-flip flop 185 is inverted by D-flip flop 187 and applied to the correction signal generator 190 and distribution circuit 200 as a sign signal $w_1$ with low level or negative sign.

When the preset signal $e_{m+1}$ from timing signal generator 130 is applied to the correction signal generator 190, as previously described, the down counters 192 and 194 preset respectively therein the binary signals w and v under control by the inverter 191. Then, the counter 192 starts to count down a value of the binary signal w in accordance with a series of the third clock signals $C_3$ through NAND-gate 193 so as to produce a high level signal therefrom. At this stage, the exclusive OR-gate 196 produces a low level signal therefrom in response to the sign signals $v_1$ and $w_1$ respectively from calculation circuits 170 and 180. Thus, the exclusive OR-gate 197 produces a high level signal therefrom in response to the high and low level signals respectively from counter 192 and exclusive OR-gate 196 so that the counter 194 is inhibited in its count operation to produce a high level signal therefrom. As a result, a correction signal z is produced from the exclusive OR-gate 198 in response to the high and low level signals respectively from counter 194 and exclusive OR-gate 196 and then applied to the distribution circuit 200.

When the distribution circuit 200 receives the operation, sign and correction signals m, $w_1$ and z, as previously described, a high level signal is produced from AND-gate 202a in response to the sign and correction signals $w_1$, z and is applied through NOR-gates 203a, 204a to AND-gate 205a. Then, a high level signal is produced from AND-gate 205a in response to the operation signal m and the high level signal from NOR-gate 204a and is applied through OR-gate 206 to the third transistor circuit 223 of drive circuit 220 as a first distribution signal. Subsequently, the transistors $TR_6$, $TR_7$ are turned on due to the first distribution signal so that the transistor $TR_7$ produces a third output signal therefrom to energize the solenoid 28a of solenoid valve 28. Thus, the solenoid valve 28 is opened to permit supply of negative pressure from induction passage 11 into the servo-chamber 23 of servomotor 20. As a result, the diaphragm 22 of servomotor 20 is displaced toward the servo-chamber 23 to increase the opening angle of throttle valve 12.

When completed the count-down operation, the counter 192 produces therefrom a low level signal which is applied to the exclusive OR-gate 197. Then, the exclusive OR-gate 197 produces a low level signal therefrom due to the low level signals from counter 192 and exclusive OR-gate 196 so that the counter 194 starts to count down a value of the binary signal v in accordance with a series of the second clock signals $C_2$ through NAND-gate 195. At this stage, the exclusive OR-gate 198 maintains generation of the correction signal z therefrom due to the high and low level signals respectively from counter 194 and exclusive OR-gate 196. When completed the count-down operation, the counter 194 produces therefrom a low level signal which is applied to the exclusive OR-gate 198 to render the correction signal z low level. Then, AND-gate 202a of distribution circuit 200 produces a low level signal therefrom at a trailing edge of the correction signal z to render the first distribution signal from OR-gate 206 low level under control by NOR-gates 203a, 204a and AND-gate 205a. Thus, the transistors $TR_6$, $TR_7$ are turned off so that the solenoid valve 28 is closed due to deenergization of solenoid 28a to block the supply of negative pressure from induction passage 11 into the servo-chamber 23. As a result, displacement of the diaphragm 22 of servomotor 20 is ceased to stop increase of the throttle opening angle.

From the above description, it will be understood that the opening angle of throttle valve 12 is increased in accordance with a width of the correction signal z defined by a sum of each value of the binary signals v and w and that decreasing rate of the actual vehicle speed is restrained due to the increase of throttle opening angle to accelerate the vehicle toward the command speed.

Assuming that at this stage the timing signal generator 130 produces a gate signal $b_M$ with a period of time $T_M$ and latch, preset and reset signals $d_M$, $e_M$ and $f_M$ in sequence, as previously described, the gate signal $b_M$ is applied to the calculation circuit 150, command-speed set circuit 160 and acceleration calculation circuit 180, and the latch signal $d_M$ is applied to the control signal generator 140 and circuits 150, 170, 180. The preset signal $e_M$ is also applied to the control and correction signal generators 140, 190 and calculation circuits 170, 180, and the reset signal $f_M$ is applied to the control signal generator 140 and circuits 150, 160 and 180. In addition, the period of time $T_M$ of gate signal $b_M$ is still longer than the period of time $T_1$ of gate signal $b_1$ due to the vehicle loads but is shorter than a period of time $T_{M-1}$ of a gate signal $b_{M-1}$ prior to the gate signal $b_M$.

When the preset signal $e_M$ from timing signal generator 130 is applied to the calculation circuits 170, 180, as previously described, the counters 171 to 173 again preset therein the binary signal u from command-speed set circuit 160 and starts to count down the value of binary signal u at a trailing edge of gate signal $b_M$ in accordance with a series of the first clock signals $C_1$. Simultaneously, the counters 183a to 183c preset therein a binary signal indicative of the period of time $T_{M-1}$ of gate signal $b_{M-1}$ which was previously issued from timing signal generator 130. Then, the counters 183a to 183c start to count down the period of time $T_{M-1}$ of the same binary signal at the trailing edge of gate signal $b_M$ in accordance with a series of the first clock signals $C_1$. Upon completing the count-down operation, the counters 183a, 183b produces therefrom a binary signal indicative of a second time difference $|T_{M-1}-T_M|$ corresponding with the remaining value of the period of time $T_{M-1}$. In other words, the binary signal from counters 183a, 183b is applied to the latch circuits 186a, 186b as a binary signal indicative of controlled acceleration of the vehicle corresponding with the second time difference $|T_{M-1}-T_M|$. At this stage, the counter 183c produces a high level signal therefrom to generate a low level signal from D-flip flop 185 under control by NOR-gate 184, as previously described. When the counter 173 produces a low level signal therefrom upon completion of each count-down operation in counters 171 to 173, D-flip flop 175 produces a high level signal therefrom, as previously described. Upon receiving the high level signal from D-flip flop 175, the counters 171 to 173 start to count up the remaining first clock signals $C_1$ defined by the period of time $T_M$ of gate signal $b_M$.

When a gate signal $b_{M+1}$ with a period of time $T_{M+1}$ and latch, preset and reset signals $d_{M+1}$, $e_{M+1}$ and $f_{M+1}$ following the gate signal $b_M$ are produced from the timing signal generator 130, each count-up operation of the counters 171 to 173 is completed at a leading edge of gate signal $b_{M+1}$. Then, a binary signal indicative of a first time difference $|T_1-T_M|$ is produced from the counters 172, 173 and applied to the latch circuits 176, 177. This means that the binary signal from counters 172, 173 is applied to the latch circuits 176, 177 as a binary signal indicative of controlled speed difference of the vehicle corresponding with the first time difference $|T_1-T_M|$. Subsequently, the binary signal from counters 172, 173 is latched and applied by the latch circuits 176, 177 to the correction signal generator 190 as a binary signal v in response to the latch signal $d_{M+1}$, and simultaneously the high level signal from D-flip flop 175 is inverted by D-flip flop 178 and applied to the correction signal generator 190 as a sign signal $v_1$ with low level or negative sign. The binary signal from counters 183a, 183b is also latched and applied by the latch circuits 186a, 186b to the correction signal generator 190 as a binary signal w in response to the latch signal $d_{M+1}$, and simultaneously the low level signal from D-flip flop 185 is inverted by D-flip flop 187 and applied as a sign signal $w_1$ with high level or positive sign to the correction signal generator 190 and distribution circuit 200.

When the exclusive OR-gate 196 of correction signal generator 190 receives the sign signal $v_1$ with the low level from calculation circuit 170 and the sign signal $w_1$ with the high level from calculation circuit 180, it produces therefrom a high level signal which is applied to the exclusive OR-gates 197, 198. When the down counters 192 and 194 receive the preset signal $e_{M+1}$ from timing signal generator 130, they preset respectively therein the binary signals w and v under control by the inverter 191. Then, the counter 192 starts to count down a value of the binary signal w in accordance with a series of the third clock signals $C_3$ so as to produce a high level signal therefrom, and the exclusive OR-gate 197 also produces a low level signal therefrom in response to the high level signals from the counter 192 and exclusive OR-gate 196. When permitted in its count operation in response to the low level signal from exclusive OR-gate 197, the counter 194 starts to count down a value of the binary signal v in accordance with a series of the second clock signals $C_2$ so as to produce a high level signal therefrom. Aditionally, any correction signal z is not produced from the exclusive OR-gate 198 due to the high level signals from the counter 194 and exclusive OR-gate 196.

Assuming that at this stage the second time difference $|T_{M-1}-T_M|$ of binary signal w is larger than the first time difference $|T_1-T_M|$ of binary singal v, count-down operation of counter 194 is completed prior to that of counter 192. Upon completing the count-down operation, the counter 194 produces therefrom a low level signal which is applied to the exclusive OR-gate 198. Then, a correction signal z is produced from the exclusive OR-gate 198 in response to the low and high level signals respectively from counter 194 and exclusive OR-gate 196 and is applied to the distribution circuit 200. When the distribution circuit 200 receives the sign signal $w_1$ with the high level and the operation and correction signals m and z, as previously described, a high level signal is produced from AND-gate 202b in response to the sign and correction signals $w_1$ and z and, in turn, applied through NOR-gates 203b, 204b to AND-gate 205b. Then, a high level signal is also produced from AND-gate 205b in response to the operation signal m and a high level signal from NOR-gate 204b and applied to the second transistor circuit 222 of drive circuit 220 through AND-gate 208 as a second distribution signal. Subsequently, the transistors $TR_4$, $TR_5$ are turned on due to the second distribution signal so that the transistor $TR_5$ produces a second output signal therefrom to energize the solenoid 27a of solenoid valve 27. Thus, the solenoid valve 27 is opened to permit supply of the atmospheric pressure from the exterior into the servo-chamber 23 of servomotor 20. As a result, the diaphragm 22 of servomotor 20 is displaced toward the atmospheric chamber 24 to decrease of the opening angle of throttle valve 12.

When completed the count-down operation, the counter 192 also produces therefrom a low level signal which is applied to the exclusive OR-gate 197. Then, the exclusive OR-gate 197 produces therefrom a high level signal due to the low and high level signals respectively from the counter 192 and exclusive OR-gate 196 so that the counter 194 produces a high level signal to render the correction signal z from exclusive OR-gate 198 low level. Subsequently, AND-gate 202b of distribution circuit 200 produces a low level signal therefrom at a trailing edge of the correction signal z to make the second distribution signal from AND-gate 208 low level under control by NOR-gates 203b, 204b and AND-gate 205b. Thus, the transistors $TR_4$, $TR_5$ are turned off so that the solenoid valve 27 is closed due to deenergization of solenoid 27a to block the supply of the atmospheric pressure from the exterior into the servo-chamber 23. As a result, displacement of the diaphragm 22 of servomotor 20 is ceased to stop decrease of the throttle opening angle.

From the above description, it will be understood that the opening angle of throttel valve 12 is reduced in accordance with a width of the correction signal z defined by a difference between each value of the binary signals v and w and that increasing rate of the actual vehicle speed is restrained due the reduction of throttle opening angle to decelerate the vehicle toward the command speed. In other words, this means that the throttle opening angle is precisely controlled by the speed control system to restrain change of acceleration of the vehicle so as to maintain the vehicle in the command speed. Furthermore, it will be understood that while the vehicle is maintained at the command speed by the speed control system, the control circuit EC holds each closure of the solenoid valves 26 to 28 to ensure each long life of the solenoid valves 26 to 28 and prevention of unnecessary losses in electric power and engine intake vacuum.

Although in the above operation decrease of the vehicle speed below the command speed due to increase of the vehicle loads is successfully controlled by the speed control system of the present invention, it will be cleary understood that increase of the vehicle speed above the command speed caused by decrease of the vehicle loads will be also successfully controlled by the speed control system, as the substantially same as the above-mentioned operation.

In case an operator of the vehicle wishes to increase the command speed up to a higher value, the acceleration switch 60 is manually closed to produce therefrom an electric signal which is applied to the control signal generator 140. Then, the electric signal from acceleration switch 60 is inverted by the inverter 147 of control signal generator 140 and applied to NOR-gate 149 and distribution circuit 200 as an acceleration signal n (see FIGS. 4, 10). When a low level signal is produced from NOR-gate 149 in response to the acceleration singal n, it is applied to OR-gate 146 to generate a high level signal from NAND-gate 141. A low level signal is also produced from NOR-gate 203a of distribution circuit 200 in response to the acceleration signal n and applied to AND-gate 205a under control by NOR-gate 204a as a high level signal. Then, a high level signal is produced from AND-gate 205a in response to the operation signal m and the high level signal from NOR-gate 204a and, in turn, applied to the third transistor circuit 223 of drive circuit 200 through OR-gate 206 as a first distribution signal. Thus, the transistors $TR_6$, $TR_7$ are turned on in response to the first distribution signal so that the transistor $TR_7$ produces therefrom a third output signal which is applied to the solenoid 28a of solenoid valve 28. As a result, the solenoid valve 28 is opened due to energization of solenoid 28a to permit supply of negative pressure from induction passage 11 into the servo-chamber 23 of servo-motor 20.

When the supply of negative pressure from induction passage 11 into the servo-chamber 23 is continued under closure of the acceleration switch 60, an opening angle of throttel valve 12 is increased to accerelate the vehicle. When the vehicle speed reaches the desired higher value over the above-noted command speed, the acceleration switch 60 is released to cease generation of the acceleration signal n from control signal generator 140 so that the high level and first distribution signals respectively from NAND-gate 141 of control signal generator 140 and OR-gate 206 of distribution circuit 200 are rendered low level respectively. Thus, the solenoid valve 28 is closed due to deenergization of solenoid 28a to isolate the servo-chamber 23 from the induction passage 11, whereas a command-speed signal $j_2$ is produced from the control signal generator 140 after generation of the low level signal from NAND-gate 141, as previously described. Thereafter, the solenoid valves 27, 28 are controlled by the electronic control circuit EC so that the vehicle is maintained by the servo-motor 20 in the desired higher speed, as previously described.

In case the operator wishes to decrease the vehicle command speed down to a lower value, the deceleration switch 70 is manually closed to produce therefrom an electric signal which is applied to the control signal generator 140. Then, the electric signal from deceleration switch 70 is inverted by the inverter 148 of control signal generator 140 and applied to NOR-gate 149 and distribution circuit 200 as a deceleration signal r (see FIGS. 4, 10). When a low level signal is produced from NOR-gate 149 in response to the deceleration signal r, it is applied to OR-gate 146 to generate a high level signal from NAND-gate 141. A low level signal is also produced from NOR-gate 203b of distribution circuit 200 in response to the deceleration signal r and applied to AND-gate 205b under control by NOR-gate 204b as a high level signal. Then, a high level signal is produced from AND-gate 205b in response to the operation signal m and the high level signal from NOR-gate 204b and, in turn, applied to the second transistor circuit 222 of drive circuit 220 through AND-gate 208 as a second distribution signal. Thus, the transistors $TR_4$, $TR_5$ are turned on in response to the second distribution signal so that the transistor $TR_5$ produces therefrom a second output signal which is applied to the solenoid 27a of solenoid valve 27. As a result, the solenoid valve 27 is opened due to energization of solenoid 27a to permit supply of the atmospheric pressure from the exterior into the servo-chamber 23.

When the supply of the atmospheric pressure from the exterior into the servo-chamber 23 is continued under closure of the deceleration switch 70, an opening angle of throttle valve 12 is decreased to decelerate the vehicle. When the vehicle speed reaches the desired lower value below the above-noted higher value, the deceleration switch 70 is released to cease generation of the deceleration signal r from control signal generator 140 so that the high level and second distribution signals respectively from NAND-gare 141 and AND-gate 208 are rendered low level respectively. Thus, the solenoid valve 27 is closed due to deenergization of solenoid 27a to isolate the servo-chamber 23 from the exterior, whereas a command-speed signal $J_3$ is produced from the control signal generator 140 after generation of the low level signal from NAND-gate 141, as previously described. Thereafter, the solenoid valves 27, 28 are controlled by the control circuit EC so that the vehicle is maintained by the servomotor 20 in the desired lower speed, as previously described.

In case an actual vehicle speed changes out of the predetermined speed range controlled by the speed control system, a release signal s is produced from the cancellation circuit 150, as previously described and applied to D-flip flop 143c of control signal generator 140 through OR-gates 144, 145 to cease generation of the operation signal m. Thus, the solenoid valve 26 is opened due to deenergization of the first transistor circuit 221, and the solenoid valves 27, 28 are closed due to deenergization of the second and third transistor circuits 222, 223 under control by the distribution circuit 200, as previously described. In addition, the above operation is also conducted by actuation of the cancel switch 50.

For practice of the present invention, the throttle actuator AC may be replaced with an electrically operated mechanism which includes a reduction-speed gear unit coupled operatively to an electric reversible motor through an electromagnetic clutch, and a rack-and-pinion connected between the gear unit and the throttel valve 12 to transmit rotation of the gear unit to the throttle valve 12 as linear motion. When the electromagnetic clutch is engaged in response to the first output signal from drive circuit 220, the gear unit is rotatably connected to the electric reversible motor. When the reversible motor is rotated in one direction in response to the second output signal from drive circuit 220, the gear unit is rotated to decrease an opening angle of throttle valve 12 in relation to linear motion given by the rack-and-pinion. When the reversible motor is rotated in the other direction in response to the third output signal from drive circuit 220, the gear unit is reversely rotated to increase the opening angle of throttle valve 12 in relation to the linear motion.

In this case, the throttle actuator AC may be also replaced with another electrically operated mechanism which includes an electric pulse motor connected operatively to the throttle valve 12 and a pulse signal generator. When received the second and third output signals from the drive circuit 220, the pulse signal generator produces each series of first and second pulse signals respectively corresponding with each width of the second and third output signals. The pulse motor is rotated in one direction in accordance with a series of the first pulse signals to decrease the opening angle of throttle valve 12. The pulse motor is also rotated in the other direction in accordance with a series of the second pulse signals to increase the opening angle of throttle valve 12.

Although in the above embodiment the speed sensor 30 having the reed switch 32 is adapted as means for detecting a vehicle speed, it may be replaced with a sensor in the form of an AC generator or a photo-coupler having a photo transistor and a light emission diode. Furthermore, the command-speed set circuit 160 may be replaced with an electronic circuit in which a binary signal indicative of a period of time corresponding with a desired vehicle speed is produced by manipulation of a digital code switch independently of the clock circuit 110, timing signal generator 130 and control signal generator 140. The correction signal generator 190 may be also replaced with another electronic circuit for producing a binary signal indicating an absolute value of a sum or difference of each value of the binary signals v and w in relation to the sign signals $v_1$ and $w_1$ and producing another sign signal indicative of one of positive and negative signs of the sum or the difference. When the binary and sign signals from another electronic circuit are applied to the distribution circuit 200, an actual vehicle speed is precisely controlled in the desired value even if change of difference between the command and actual vehicle speeds is larger than that of acceleration of the vehicle.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A speed control system for an automotive vehicle driven by an internal combustion engine under control of a throttle valve, the control system comprising:

first means for producing a timing signal with a period of time responsive to an actual speed of the vehicle;

second means for producing a command signal indicative of a predetermined period of time defined by a desired speed of the vehicle;

third means responsive to the timing signal for calculating a first time difference between the predetermined period of time and an instant period of time of the timing signal and for producing a first differential signal indicative of an absolute value of the calculated first time difference and a first sign signal indicative of one of positive and negative signs of the calculated first time difference;

fourth means responsive to the timing signal for calculating a second time difference between respective instant periods of time of the preceding and following timing signals and for producing a second differential signal indicative of an absolute value of the calculated second time difference and a second sign signal indicative of one of positive and negative signs of the calculated second time difference;

fifth means responsive to the timing signal for calculating a sum of the absolute values when respective signs of the first and second sign signals are identical to each other and for calculating a difference between the absolute values when respective signs of the first and second sign signals are opposite to each other, said fifth means selectively producing first and second correction signals respectively indicative of the calculated sum and the calculated difference, said fifth means ceasing to produce the first and second correction signals when the respective calculated values are zero;

sixth means responsive to the timing signal and one of the first and second correction signals for selectively producing first and second control signals respectively in relation to the positive and negative signs of the second sign signal; and actuator means for decreasing and increasing an opening angle of said throttle valve respectively in response to the first and second control signals.

2. A speed control system as claimed in claim 1, further comprising a clock circuit for producing a series of clock signals at a constant frequency in sequence; and wherein said first means includes a counter circuit for counting a series of the clock signals in accordance with the actual speed of the vehicle to produce a timing signal with a period of time defined by the number of the counted clock signals; and said second means includes a counter circuit for counting a series of the clock signals corresponding with a desired vehicle speed to produce a command signal indicative of a predetermined period of time defined by the number of the counted clock signals.

3. A speed control system as claimed in claim 2, wherein said third means includes a counter circuit for counting down the predetermined number of the clock signals defined by the command signal in response to each of the timing signals when the predetermined period of time is longer than an instant period of time defined by each of the timing signals and counting up the number of the clock signals defined by each of the timing signals after completion of counting down the predetermined number of the clock signals when the predetermined period of time is shorter than an instant period of time defined by each of the timing signals, said counter circuit producing a first differential signal indicative of an absolute value of a difference between the number of the clock signals respectively defined by the command signal and each of the timing signals and producing first positive and negative sign signals respectively when the predetermined number of the clock signals is counted down and the number of the clock signals defined by each of the timing signals is counted up.

4. A speed control system as claimed in claim 2 or 3, wherein said fourth means includes:

a first counter circuit for counting the number of the clock signals defined by the preceding timing signal; and a second counter circuit for counting down the number of the previously counted clock signals responsive to the following timing signal when a period of time of the preceding timing signal is longer than that of the following timing signal and succesively counting up the number of the clock signals defined by the following timing signal after completion of counting down the number of the previously counted clock signals when a period of time of the preceding timing signal is shorter than that of the following timing signal, said second counter circuit producing a second differential signal indicative of an absolute value of a difference between the number of the clock signals respectively defined by the preceding and following timing signals and producing second positive and negative sign signals respectively when the number of the previously counted clock signals is counted down and the number of the clock signals defined by the following timing signal is counted up.

5. A speed control system as claimed in claim 2 or 3, wherein said fifth means includes:

a first down counter responsive to the timing signal for counting down the number of the clock signals defined by the second differential signal to produce a high level signal during its counting down operation;

a first logic element for producing a low level signal when respective sings of the first and second sign signals are identical to each other and for producing a high level signal when respective signs of the first and second sign signals are opposite to each other;

a second down counter circuit responsive to the timing signal and to the high level signals from said first down counter circuit and said first logic element for counting down the number of the clock signals defined by the first differential signal to produce a first high level signal during its counting down operation and to produce a low level signal upon completion of its counting down operation, said second counter circuit being responsive to the high and low level signals from said first down counter circuit and said first logic element for producing a second high level signal and responsive to a trailing edge of the high level signal from said first down counter circuit for counting down the number of the clock signals defined by the first differential signal to maintain the second high level signal generated therefrom during its counting down operation; and a second logic element for producing a first correction signal indicative of a width of the low level signal from said second down counter circuit in relation to the high and low level signals from said first logic element and said second down counter circuit and for producing a second correction signal indicative of a width of the second high level signal from said second down counter circuit in relation to the low and second high level signals from said first logic element and said second down counter circuit, said second logic element ceasing the first and second correction signals when said first logic element and said second down counter circuit produce the same level signals.

6. A speed control system as claimed in claim 1, wherein said actuator means includes:

a servomotor associated with said throttle valve for decreasing and increasing the opening angle of said throttle valve in accordance with pneumatic pressure applied thereto; and first and second electrically operated valves to selectively apply engine intake vacuum and the atmospheric pressure to said servomotor in response to one of the first and second control signals.

7. A speed control system as claimed in claim 1, wherein said actuator means includes:

an electric reversible motor to be operated in one direction in response to the first control signal and to be operated in the other direction in response to the second control signal; and a reduction gear unit associated with said electric motor for decreasing and increasing the opening angle of said throttle valve respectively in accordance with each operation of said reversible motor in one direction and in the other direction.

8. A speed control system as claimed in claim 1, wherein said actuator means includes:

a pulse signal generator respectively responsive to the first and second control signals to produce each series of first and second pulse signals respectively corresponding with each width of the first and second control signals; and an electric pulse motor for decreasing and increasing the opening angle of said throttle valve respectively in response to each series of the first and second pulse signals.

9. A speed control system as claimed in claim 4 wherein said fifth means includes;

a first down counter circuit responsive to the timing signal for counting down the number of the clock signals defined by the second differential signal to produce a high level signal during its counting down operation;

a first logic element for producing a low level signal when respective signs of the first and second sign signals are identical to each other and for producing a high level signal when respective signs of the first and second sign signals are opposite to each other;

a second down counter circuit responsive to the timing signal and to the high level signals from said first down counter circuit and said first logic element for counting down the number of the clock signals defined by the first differential signal to produce a first high level signal during its counting down operation and to produce a low level signal upon completion of its counting down operation, said second counter circuit being responsive to the high and low level signals from said first down counter circuit and said first logic element for producing a second high level signal and responsive to a trailing edge of the high level signal from said first down counter circuit for counting down the number of the clock signals defined by the first differential signal to maintain the second high level signal generated therefrom during its counting down operation; and a second logic element for producing a first correction signal indicative of a width of the low level signal from said second down counter circuit in relation to the high and low level signals from said first logic element and said second down counter circuit and for producing a second correction signal indicative of a width of the second high level signal from said second down counter circuit in relation to the low and second high level signals from said first logic element and said second down counter circuit, said second logic element ceasing the first and second correction signals when said first logic element and said second down counter circuit produce the same level signals.

* * * * *